(12) United States Patent
Matsuoka et al.

(10) Patent No.: US 9,696,735 B2
(45) Date of Patent: Jul. 4, 2017

(54) CONTEXT ADAPTIVE COOL-TO-DRY FEATURE FOR HVAC CONTROLLER

(71) Applicant: Google Inc., Mountain View, CA (US)

(72) Inventors: Yoky Matsuoka, Palo Alto, CA (US); Evan J. Fisher, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 932 days.

(21) Appl. No.: 13/871,746

(22) Filed: Apr. 26, 2013

(65) Prior Publication Data

US 2014/0319231 A1  Oct. 30, 2014

(51) Int. Cl.
| | |
|---|---|
| G05D 27/00 | (2006.01) |
| F24F 3/14 | (2006.01) |
| G05D 27/02 | (2006.01) |
| G05D 22/02 | (2006.01) |
| G05D 23/19 | (2006.01) |

(52) U.S. Cl.
CPC .............. *G05D 27/02* (2013.01); *G05D 22/02* (2013.01); *G05D 23/1902* (2013.01); *F24F 3/1405* (2013.01)

(58) Field of Classification Search
CPC ........ G05D 27/00; G05D 27/02; F24F 3/1405
See application file for complete search history.

(56) References Cited

U.S. PATENT DOCUMENTS

| | | | |
|---|---|---|---|
| 3,991,357 A | 11/1976 | Kaminski | |
| 4,183,290 A | 1/1980 | Kucharczyk | |
| 4,223,831 A | 9/1980 | Szarka | |
| 4,335,847 A | 6/1982 | Levine | |
| 4,408,711 A | 10/1983 | Levine | |
| 4,615,380 A | 10/1986 | Beckey | |
| 4,674,027 A | 6/1987 | Beckey | |
| 4,685,614 A | 8/1987 | Levine | |

(Continued)

FOREIGN PATENT DOCUMENTS

| | | |
|---|---|---|
| CA | 2202008 | 2/2000 |
| EP | 196069 | 12/1991 |

(Continued)

OTHER PUBLICATIONS

Aprilaire Electronic Thermostats Model 8355 User's ManualResearch Products Corporation, Dec. 2000, 16 pages.

(Continued)

*Primary Examiner* — Len Tran
*Assistant Examiner* — Alexis Cox
(74) *Attorney, Agent, or Firm* — Kilpatrick Townsend & Stockton LLP

(57) ABSTRACT

A thermostat and a method include using occupancy sensors, temperature sensors, and humidity sensors to control activation of a cooling function of an HVAC system to dehumidify an enclosure. During times when the enclosure is occupied, the cooling function is activated when the humidity exceeds a first threshold humidity, and continues until the humidity drops below a second threshold humidity or the temperature drops below a first threshold temperature. During times when the enclosure is unoccupied, the cooling function is activated when the humidity exceeds a third threshold humidity, and continues until the humidity drops below a fourth threshold humidity or the temperature drops below a second threshold temperature.

18 Claims, 17 Drawing Sheets

(56) References Cited

U.S. PATENT DOCUMENTS

| | | | |
|---|---|---|---|
| 4,751,961 A | 6/1988 | Levine et al. | |
| 4,897,798 A | 1/1990 | Cler | |
| 4,971,136 A | 11/1990 | Mathur et al. | |
| 5,088,645 A | 2/1992 | Bell | |
| 5,211,332 A | 5/1993 | Adams | |
| 5,240,178 A | 8/1993 | Dewolf et al. | |
| 5,244,146 A | 9/1993 | Jefferson et al. | |
| 5,395,042 A | 3/1995 | Riley et al. | |
| 5,476,221 A | 12/1995 | Seymour | |
| 5,499,196 A | 3/1996 | Pacheco | |
| 5,544,809 A | 8/1996 | Keating et al. | |
| 5,555,927 A | 9/1996 | Shah | |
| 5,611,484 A | 3/1997 | Uhrich | |
| 5,808,294 A | 9/1998 | Neumann | |
| 5,902,183 A | 5/1999 | D'Souza | |
| 5,909,378 A | 6/1999 | De Milleville | |
| 5,918,474 A | 7/1999 | Khanpara et al. | |
| 5,977,964 A | 11/1999 | Williams et al. | |
| 6,062,482 A | 5/2000 | Gauthier et al. | |
| 6,066,843 A | 5/2000 | Scheremeta | |
| 6,070,110 A * | 5/2000 | Shah | F24F 11/0008 165/205 |
| 6,072,784 A | 6/2000 | Agrawal et al. | |
| 6,095,427 A | 8/2000 | Hoium et al. | |
| 6,098,893 A | 8/2000 | Berglund et al. | |
| 6,216,956 B1 | 4/2001 | Ehlers et al. | |
| 6,349,883 B1 | 2/2002 | Simmons et al. | |
| 6,356,204 B1 | 3/2002 | Guindi et al. | |
| 6,370,894 B1 | 4/2002 | Thompson et al. | |
| 6,415,205 B1 | 7/2002 | Myron et al. | |
| 6,478,233 B1 | 11/2002 | Shah | |
| 6,645,066 B2 | 11/2003 | Gutta et al. | |
| 6,769,482 B2 | 8/2004 | Wagner et al. | |
| 6,843,068 B1 | 1/2005 | Wacker | |
| 6,990,821 B2 | 1/2006 | Singh et al. | |
| 7,024,336 B2 | 4/2006 | Salsbury et al. | |
| 7,083,109 B2 | 8/2006 | Pouchak | |
| 7,149,727 B1 | 12/2006 | Nicholls et al. | |
| 7,149,729 B2 | 12/2006 | Kaasten et al. | |
| 7,188,482 B2 | 3/2007 | Sadegh et al. | |
| 7,222,800 B2 | 5/2007 | Wruck | |
| 7,379,791 B2 | 5/2008 | Tamarkin et al. | |
| RE40,437 E | 7/2008 | Rosen | |
| 7,469,550 B2 | 12/2008 | Chapman, Jr. et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,848,900 B2 | 12/2010 | Steinberg et al. | |
| 7,849,698 B2 | 12/2010 | Harrod et al. | |
| 7,854,389 B2 | 12/2010 | Ahmed | |
| 8,010,237 B2 | 8/2011 | Cheung et al. | |
| 8,019,567 B2 | 9/2011 | Steinberg et al. | |
| 8,037,022 B2 | 10/2011 | Rahman et al. | |
| 8,090,477 B1 | 1/2012 | Steinberg | |
| 8,091,375 B2 | 1/2012 | Crawford | |
| 8,131,497 B2 | 3/2012 | Steinberg et al. | |
| 8,174,381 B2 | 5/2012 | Imes et al. | |
| 8,180,492 B2 | 5/2012 | Steinberg | |
| 8,219,249 B2 | 7/2012 | Harrod et al. | |
| 2003/0181158 A1* | 9/2003 | Schell | F24F 3/0442 454/229 |
| 2004/0249479 A1 | 12/2004 | Shorrock | |
| 2005/0090915 A1 | 4/2005 | Geiwitz | |
| 2005/0128067 A1 | 6/2005 | Zakrewski | |
| 2005/0150968 A1 | 7/2005 | Shearer | |
| 2005/0189429 A1 | 9/2005 | Breeden | |
| 2005/0192915 A1 | 9/2005 | Ahmed et al. | |
| 2005/0280421 A1 | 12/2005 | Yomoda et al. | |
| 2006/0186214 A1 | 8/2006 | Simon et al. | |
| 2006/0196953 A1 | 9/2006 | Simon et al. | |
| 2006/0260334 A1* | 11/2006 | Carey | F24F 3/1405 62/176.6 |
| 2007/0045431 A1 | 3/2007 | Chapman, Jr. et al. | |
| 2007/0115902 A1 | 5/2007 | Shamoon et al. | |
| 2007/0205297 A1 | 9/2007 | Finkam et al. | |
| 2008/0015742 A1 | 1/2008 | Kulyk et al. | |
| 2008/0183335 A1 | 7/2008 | Poth et al. | |
| 2008/0191045 A1 | 8/2008 | Harter | |
| 2008/0273754 A1 | 11/2008 | Hick et al. | |
| 2008/0317292 A1 | 12/2008 | Baker et al. | |
| 2009/0158758 A1* | 6/2009 | Eguchi | F24F 11/006 62/157 |
| 2009/0171862 A1 | 7/2009 | Harrod et al. | |
| 2009/0254225 A1 | 10/2009 | Boucher et al. | |
| 2009/0259713 A1 | 10/2009 | Blumrich et al. | |
| 2009/0297901 A1 | 12/2009 | Kilian et al. | |
| 2009/0327354 A1 | 12/2009 | Resnick et al. | |
| 2010/0019051 A1 | 1/2010 | Rosen | |
| 2010/0025483 A1 | 2/2010 | Hoeynck et al. | |
| 2010/0050004 A1 | 2/2010 | Hamilton, II et al. | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0167783 A1 | 7/2010 | Alameh et al. | |
| 2010/0179704 A1 | 7/2010 | Ozog | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0046792 A1 | 2/2011 | Imes et al. | |
| 2011/0046805 A1 | 2/2011 | Bedros et al. | |
| 2011/0046806 A1 | 2/2011 | Nagel et al. | |
| 2011/0077758 A1 | 3/2011 | Tran et al. | |
| 2011/0077896 A1 | 3/2011 | Steinberg et al. | |
| 2011/0151837 A1 | 6/2011 | Winbush, III | |
| 2011/0160913 A1 | 6/2011 | Parker et al. | |
| 2011/0185895 A1 | 8/2011 | Freen | |
| 2011/0307103 A1 | 12/2011 | Cheung et al. | |
| 2011/0307112 A1 | 12/2011 | Barrilleaux | |
| 2012/0017611 A1 | 1/2012 | Coffel et al. | |
| 2012/0065935 A1 | 3/2012 | Steinberg et al. | |
| 2012/0085831 A1 | 4/2012 | Kopp | |
| 2012/0101637 A1 | 4/2012 | Imes et al. | |
| 2012/0130679 A1* | 5/2012 | Fadell | F24F 11/0012 702/183 |
| 2012/0158350 A1 | 6/2012 | Steinberg et al. | |
| 2012/0186774 A1* | 7/2012 | Matsuoka | G05B 15/02 165/11.1 |
| 2012/0221151 A1 | 8/2012 | Steinberg | |
| 2012/0252430 A1 | 10/2012 | Imes et al. | |
| 2013/0098596 A1 | 4/2013 | Fisher et al. | |
| 2013/0103204 A1 | 4/2013 | Stefanski et al. | |
| 2014/0230475 A1* | 8/2014 | Matsui | F24F 3/1429 62/186 |

FOREIGN PATENT DOCUMENTS

| | | |
|---|---|---|
| JP | 59106311 | 6/1984 |
| JP | 01252850 | 10/1989 |
| WO | 2014/176271 A1 | 10/2014 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.

(56) References Cited

OTHER PUBLICATIONS

Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, in Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, in Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.
International Search Report and Written Opinion mailed Sep. 4, 2014 for PCT/US2014/035019 filed on Apr. 22, 2014, 16 pages.
International Preliminary Report on Patentability mailed Nov. 5, 2015, for International Patent Application No. PCT/US2014/035019, 10 pages.

* cited by examiner

CONTEXT ADAPTIVE COOL-TO-DRY FEATURE FOR HVAC CONTROLLER

TECHNICAL FIELD

This patent specification relates to systems and methods for the monitoring and control of energy-consuming systems or other resource-consuming systems. More particularly, this patent specification relates to control units that govern the operation of energy-consuming systems, household devices, or other resource-consuming systems, including methods for activating electronic displays for thermostats that govern the operation of heating, ventilation, and air conditioning (HVAC) systems.

BACKGROUND OF THE INVENTION

Substantial effort and attention continue toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment.

As discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two required external connections.

When electronics began to be used in thermostats, the fact that the thermostat was not directly wired to both sides of the transformer for its power source created a problem. This meant that the thermostat had to be hardwired directly from the system transformer. Direct hardwiring a common "C" wire from the transformer to the electronic thermostat may be very difficult and costly.

Because many households do not have a direct wire from the system transformer (such as a "C" wire), some thermostats have been designed to derive power from the transformer through the equipment load. The methods for powering an electronic thermostat from the transformer with a single direct wire connection to the transformer are called "power stealing" or "power sharing" methods. The thermostat "steals," "shares," or "harvests" its power during the "OFF" periods of the heating or cooling system by allowing a small amount of current to flow through it into the load coil below the load coil's response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing.

Additionally, microprocessor controlled "intelligent" thermostats may have more advanced environmental control capabilities that can save energy while also keeping occupants comfortable. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

BRIEF SUMMARY OF THE INVENTION

In one embodiment, a thermostat may include a housing, a user interface, one or more temperature sensors, each of the one or more temperature sensors being configured to provide temperature sensor measurements, a humidity sensor configured to provide humidity sensor measurements, an occupancy sensing system that characterizes an occupancy status of an enclosure in which the thermostat is installed from among a plurality of possible occupancy statuses including an occupied state and an away state; and a processing system disposed within the housing. The processing system may be configured to be in operative communication with the one or more temperature sensors to receive the temperature sensor measurements. The processing system may be configured to be in operative communication with one or more input devices including the user interface for determining a setpoint temperature. The processing system may be configured to be in still further operative communication with a heating, ventilation, and air conditioning (HVAC) system to control the HVAC system based at least in part on the setpoint temperature and the temperature sensor measurements. The processing system may also be configured to operate in conjunction with the occupancy sensing system to provide an occupancy-status-sensitive automated dehumidification feature comprising: (i) an occupied-state automated dehumidification algorithm designed to operate according to combined comfort-and-humidity criteria characterized in that when the humidity sensor measurements are above a first humidity threshold, and the temperature sensor measurements are below the setpoint temperature, a cooling function of the HVAC system may operate in order to reduce a humidity level in the enclosure until a first set of conditions are met; and (ii) an away-state automated dehumidification algorithm designed to operate according to away-humidity criteria characterized in that when the humidity sensor measurements are above a second humidity threshold, and the temperature sensor measurements are below the setpoint temperature, the cooling function of the HVAC system may operate in order to reduce the humidity level in the enclosure until a second set of conditions are met.

In another embodiment a method of dehumidifying an enclosure using a cooling function of an HVAC system may include characterizing, using an occupancy sensing system of a thermostat, an occupancy status of the enclosure, the occupancy status being selected from among a plurality of possible occupancy statuses including an occupied state and an away state. The method may also include processing humidity sensor measurements provided by a humidity sensor of the thermostat. In some embodiments, the thermostat may include a housing, a user interface, one or more temperature sensors, each of the one or more temperature sensors being configured to provide temperature sensor measurements, the humidity sensor, the occupancy sensing system, and a processing system disposed within the housing. The processing system may be configured to be in operative communication with the one or more temperature sensors to receive the temperature sensor measurements. The processing system may be configured to be in operative communication with one or more input devices including the user interface for determining a setpoint temperature. The processing system may be configured to be in still further operative communication with a heating, ventilation, and air conditioning (HVAC) system to control the HVAC system based at least in part on the setpoint temperature and the temperature sensor measurements. The method may additionally include operating, using a processing system of the thermostat, an occupancy-status-sensitive automated dehumidification feature. This feature may include (i) an occupied-state automated dehumidification algorithm designed to operate according to combined comfort-and-humidity criteria characterized in that when the humidity sensor measurements are above a first humidity threshold, and the temperature sensor measurements are below the setpoint temperature, a cooling function of the HVAC system may operate in order to reduce a humidity level in the enclosure until a first set of conditions are met; and (ii) an away-state automated dehumidification algorithm designed to operate according to away-humidity criteria characterized in that when the humidity sensor measurements are above a second humidity threshold, and the temperature sensor measurements are below the setpoint temperature, the cooling function of the HVAC system may operate in order to reduce the humidity level in the enclosure until a second set of conditions are met.

In yet another embodiment, a thermostat may include one or more temperature sensors that provides temperature sensor measurements, a humidity sensor that provides humidity sensor measurements, an occupancy sensing system that may be used to characterize an occupancy status of an enclosure in which the thermostat is installed from among a plurality of possible occupancy statuses including an occupied state and an away state; and a processing system. The processing system may be configured to activate a cooling function of an HVAC system to reduce a humidity level in the enclosure based on a first set of conditions when the occupancy status is in the occupied state, or based on a second set of conditions when the occupancy status is in the away state.

A further understanding of the nature and advantages of the present invention may be realized by reference to the remaining portions of the specification and the drawings. Also note that other embodiments may be described in the following disclosure and claims.

DETAILED DESCRIPTION OF THE INVENTION

Figure 1:
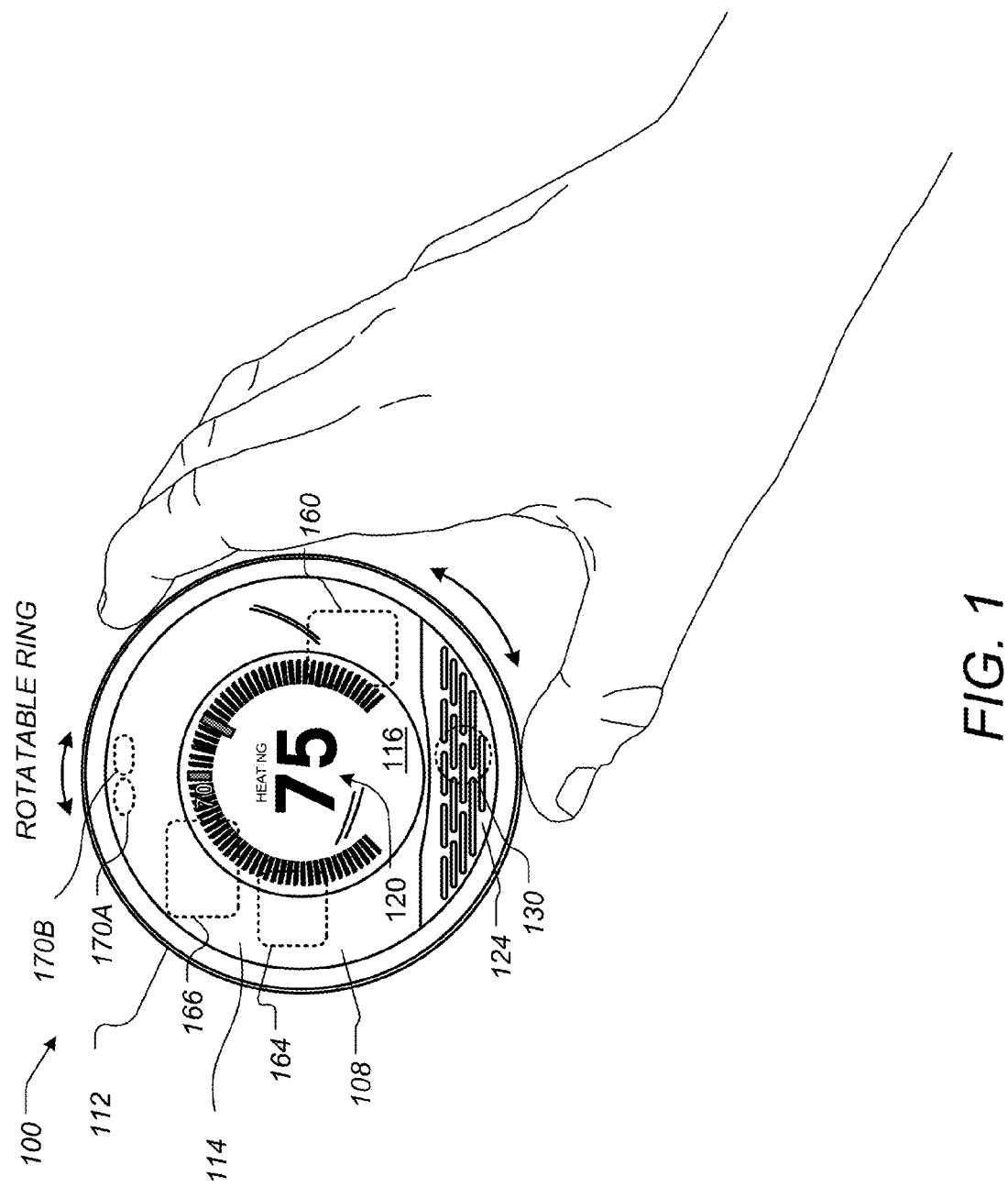
FIG. 1 illustrates a perspective view of a thermostat, according to one embodiment.

The subject matter of this patent specification relates to the subject matter of the following commonly assigned applications, each of which is incorporated by reference herein: U.S. Ser. No. 13/864,929 filed Apr. 17, 2013 (Ref. No. NES0334-US); U.S. Ser. No. 13/632,070 filed Sep. 30, 2012 (Ref. No. NES0234-US); U.S. Ser. No. 13/624,881 filed Sep. 21, 2012 (Ref. No. NES0233-US); U.S. Ser. No. 13/624,811 filed Sep. 21, 2012 (Ref. No. NES0232-US); International Application No. PCT/US12/00007 filed Jan. 3, 2012 (Ref. No. NES0190-PCT); U.S. Ser. No. 13/466,815 filed May 8, 2012 (Ref. No. NES0179-US); U.S. Ser. No. 13/467,025 filed May 8, 2012 (Ref. No. NES0177-US); U.S. Ser. No. 13/351,688 filed Jan. 17, 2012, which issued as U.S. Pat. No. 8,195,313 on Jun. 5, 2012 (Ref. No. NES0175-US); U.S. Ser. No. 13/632,041 filed Sep. 30, 2012 (Ref. No. NES0162-US); U.S. Ser. No. 13/632,028 filed Sep. 30, 2012 (Ref. No. NES0124-US); and U.S. Ser. No. 13/632,093 filed Sep. 30, 2012 (Ref. No. NES0122-US). The above-referenced patent applications are collectively referenced herein as "the commonly-assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Exemplary Thermostat Embodiments

Provided according to one or more embodiments are systems, methods, and computer program products for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, and easy to use. The term "thermostat" is used herein below to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments herein to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIGS. 1-5 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 1 illustrates a perspective view of a thermostat 100, according to one embodiment. In this specific embodiment, the thermostat 100 can be controlled by at least two types of user input, the first being a rotation of the outer ring 112, and the second being an inward push on an outer cap 108 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 100.

For this embodiment, the outer cap 108 can comprise an assembly that includes the outer ring 112, a cover 114, an electronic display 116, and a metallic portion 124. Each of these elements, or the combination of these elements, may be referred to as a "housing" for the thermostat 100. Simultaneously, each of these elements, or the combination of these elements, may also form a user interface. The user interface may specifically include the electronic display 116. In FIG. 1, the user interface 116 may be said to operate in an active display mode. The active display mode may include providing a backlight for the electronic display 116. In other embodiments, the active display mode may increase the intensity and/or light output of the electronic display 116 such that a user can easily see displayed settings of the thermostat 100, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 116, depending on the embodiment.

Depending on the settings of the thermostat 100, the active display mode and the inactive display mode of the electronic display 116 may also or instead be characterized by the relative power usage of each mode. In one embodiment, the active display mode may generally require substantially more electrical power than the inactive display mode. In some embodiments, different operating modes of the electronic display 116 may instead be characterized completely by their power usage. In these embodiments, the different operating modes of the electronic display 116 may be referred to as a first mode and a second mode, where the user interface requires more power when operating in the first mode than when operating in the second mode.

According to some embodiments the electronic display 116 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 116 may be a backlit color liquid crystal display (LCD). An example of information displayed on the electronic display 116 is illustrated in FIG. 1, and includes central numerals 120 that are representative of a current setpoint temperature. According to some embodiments, metallic portion 124 can have a number of slot-like openings so as to facilitate the use of a sensors 130, such as a passive infrared motion sensor (PIR), mounted beneath the slot-like openings.

According to some embodiments, the thermostat 100 can include additional components, such as a processing system 160, display driver 164, and a wireless communications system 166. The processing system 160 can adapted or configured to cause the display driver 164 to cause the electronic display 116 to display information to the user. The processing system 160 can also be configured to receive user input via the rotatable ring 112. These additional components, including the processing system 160, can be enclosed within the housing, as displayed in FIG. 1. These additional components are described in further detail herein below.

The processing system 160, according to some embodiments, is capable of carrying out the governance of the thermostat's operation. For example, processing system 160 can be further programmed and/or configured to maintain and update a thermodynamic model for the enclosure in which the HVAC system is installed. According to some embodiments, the wireless communications system 166 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy. According to some embodiments, occupancy information can be a used in generating an effective and efficient scheduled program. For example, an active proximity sensor 170A can be provided to detect an approaching user by infrared light reflection, and an ambient light sensor 170B can be provided to sense visible light. The proximity sensor 170A can be used in conjunction with a plurality of other sensors to detect proximity in the range of about one meter so that the thermostat 100 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

Figure 2:
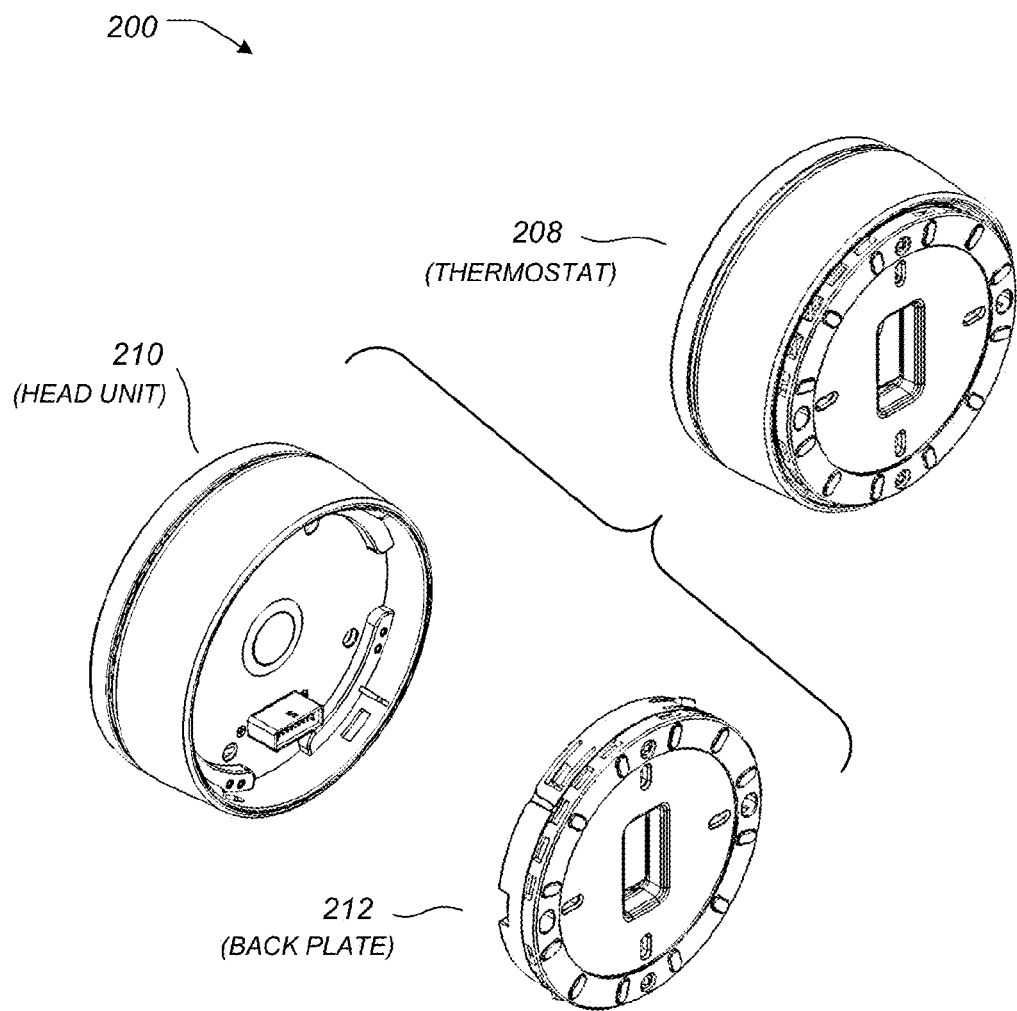
FIG. 2 illustrates an exploded perspective view of a thermostat having a head unit and the backplate, according to one embodiment.

In some embodiments, the thermostat can be physically and/or functionally divided into at least two different units. Throughout this disclosure, these two units can be referred to as a head unit and a backplate. FIG. 2 illustrates an exploded perspective view 200 of a thermostat 208 having a head unit 210 and a backplate 212, according to one embodiment. Physically, this arrangement may be advantageous during an installation process. In this embodiment, the backplate 212 can first be attached to a wall, and the HVAC wires can be attached to a plurality of HVAC connectors on the backplate 212. Next, the head unit 210 can be connected to the backplate 212 in order to complete the installation of the thermostat 208.

Figure 3A:
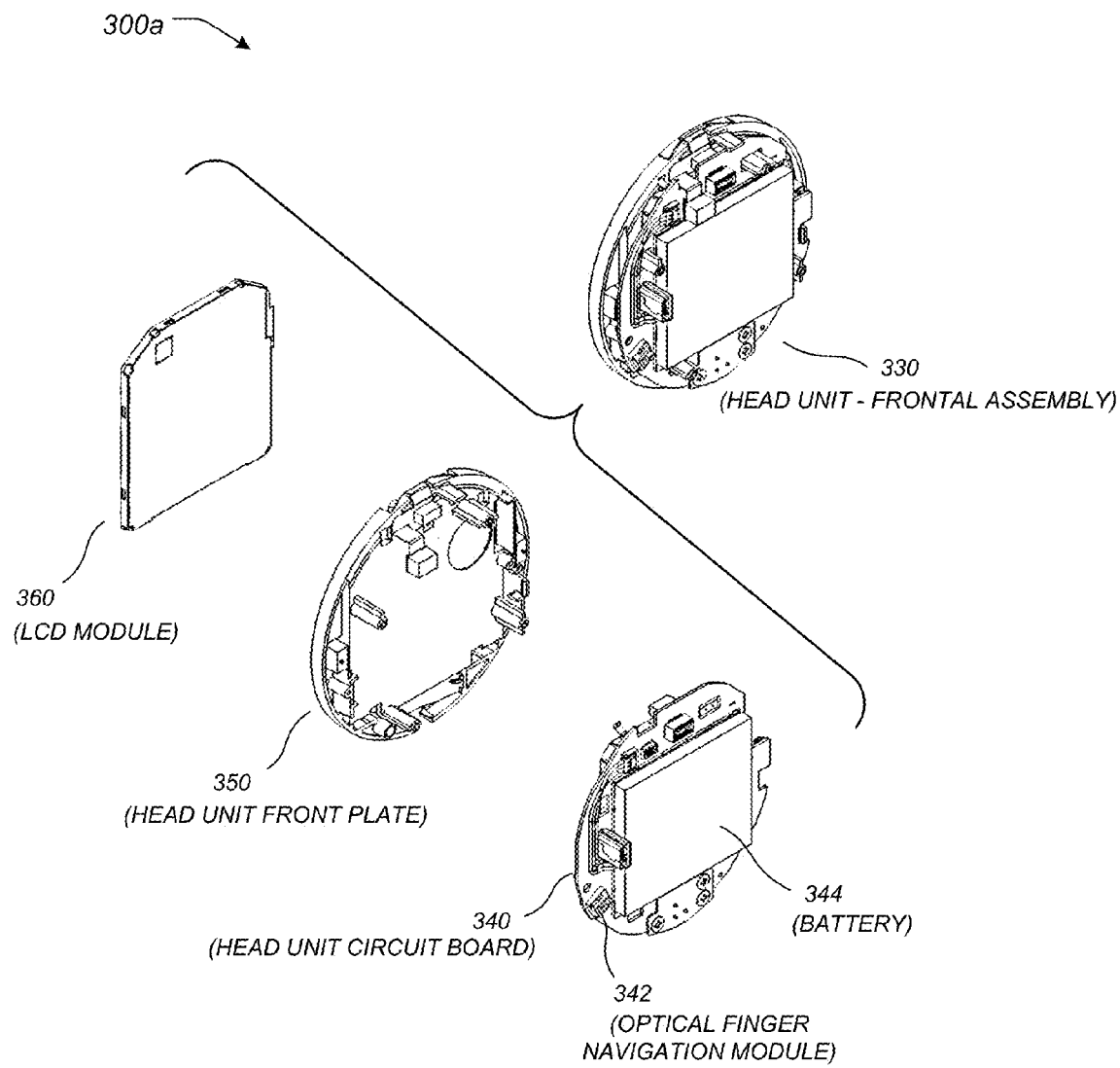
FIG. 3A illustrates an exploded perspective view of a head unit with respect to its primary components, according to one embodiment.

FIG. 3A illustrates an exploded perspective view 300a of a head unit 330 with respect to its primary components, according to one embodiment. Here, the head unit 330 may include an electronic display 360. According to this embodiment, the electronic display 360 may comprise an LCD module. Furthermore, the head unit 330 may include a mounting assembly 350 used to secure the primary components in a completely assembled head unit 330. The head unit 330 may further include a circuit board 340 that can be used to integrate various electronic components described further below. In this particular embodiment, the circuit board 340 of the head unit 330 can include a manipulation sensor 342 to detect user manipulations of the thermostat. In embodiments using a rotatable ring, the manipulation sensor 342 may comprise an optical finger navigation module as illustrated in FIG. 3A. A rechargeable battery 344 may also be included in the assembly of the head unit 330. In one preferred embodiment, rechargeable battery 344 can be a Lithium-Ion battery, which may have a nominal voltage of 3.7 volts and a nominal capacity of 560 mAh.

Figure 3B:
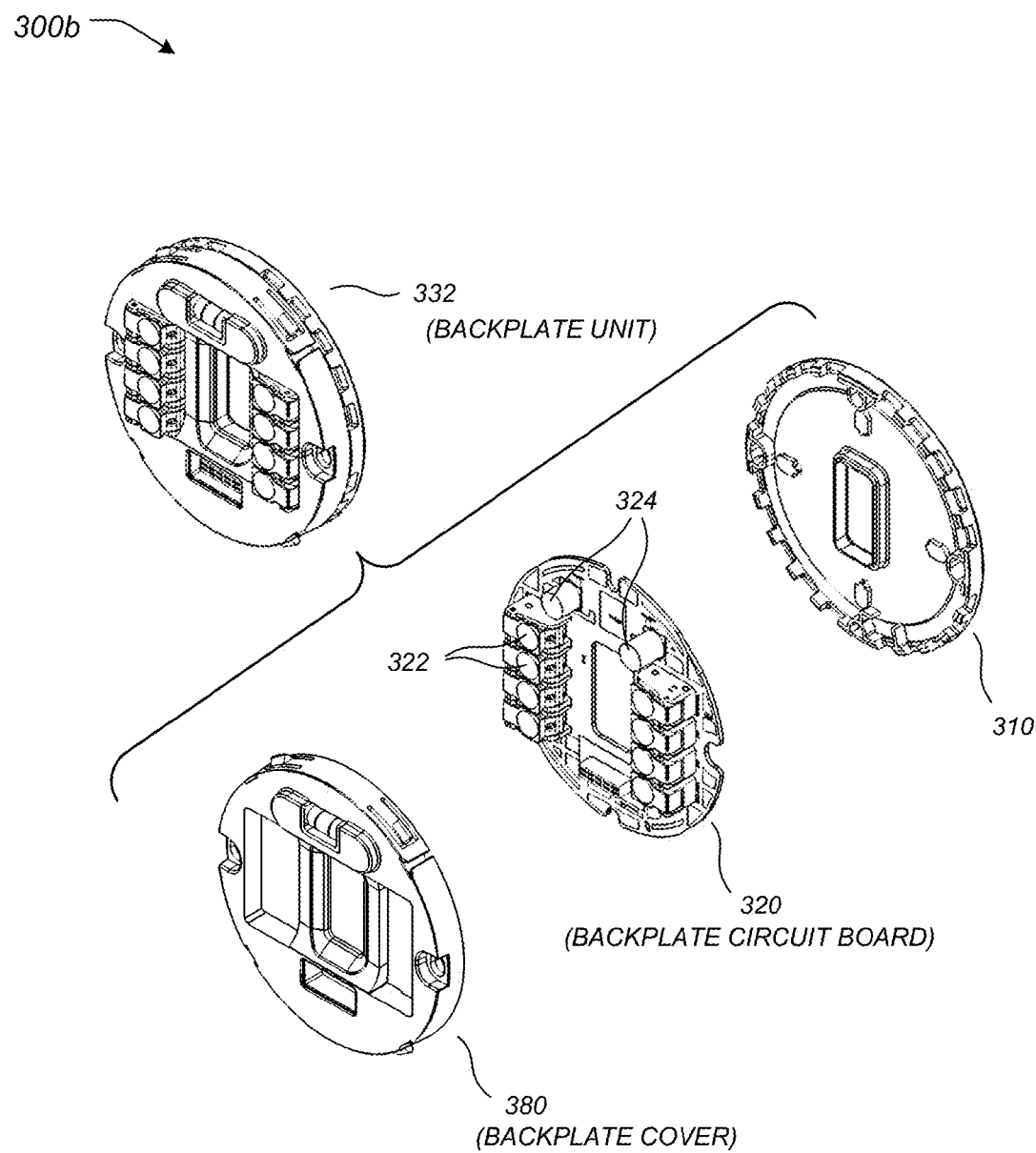
FIG. 3B illustrates an exploded perspective view of a backplate with respect to its primary components, according to one embodiment.

FIG. 3B illustrates an exploded perspective view 300b of a backplate 332 with respect to its primary components, according to one embodiment. The backplate 332 may include a frame 310 that can be used to mount, protect, or house a backplate circuit board 320. The backplate circuit board 320 may be used to mount electronic components, including one or more processing functions, and/or one or more HVAC wire connectors 322. The one or more HVAC wire connectors 322 may include integrated wire insertion sensing circuitry configured to determine whether or not a wire is mechanically and/or electrically connected to each of the one or more HVAC wire connectors 322. In this particular embodiment, two relatively large capacitors 324 are a part of power stealing circuitry that can be mounted to the backplate circuit board 320. The power stealing circuitry is discussed further herein below.

Figure 4A:
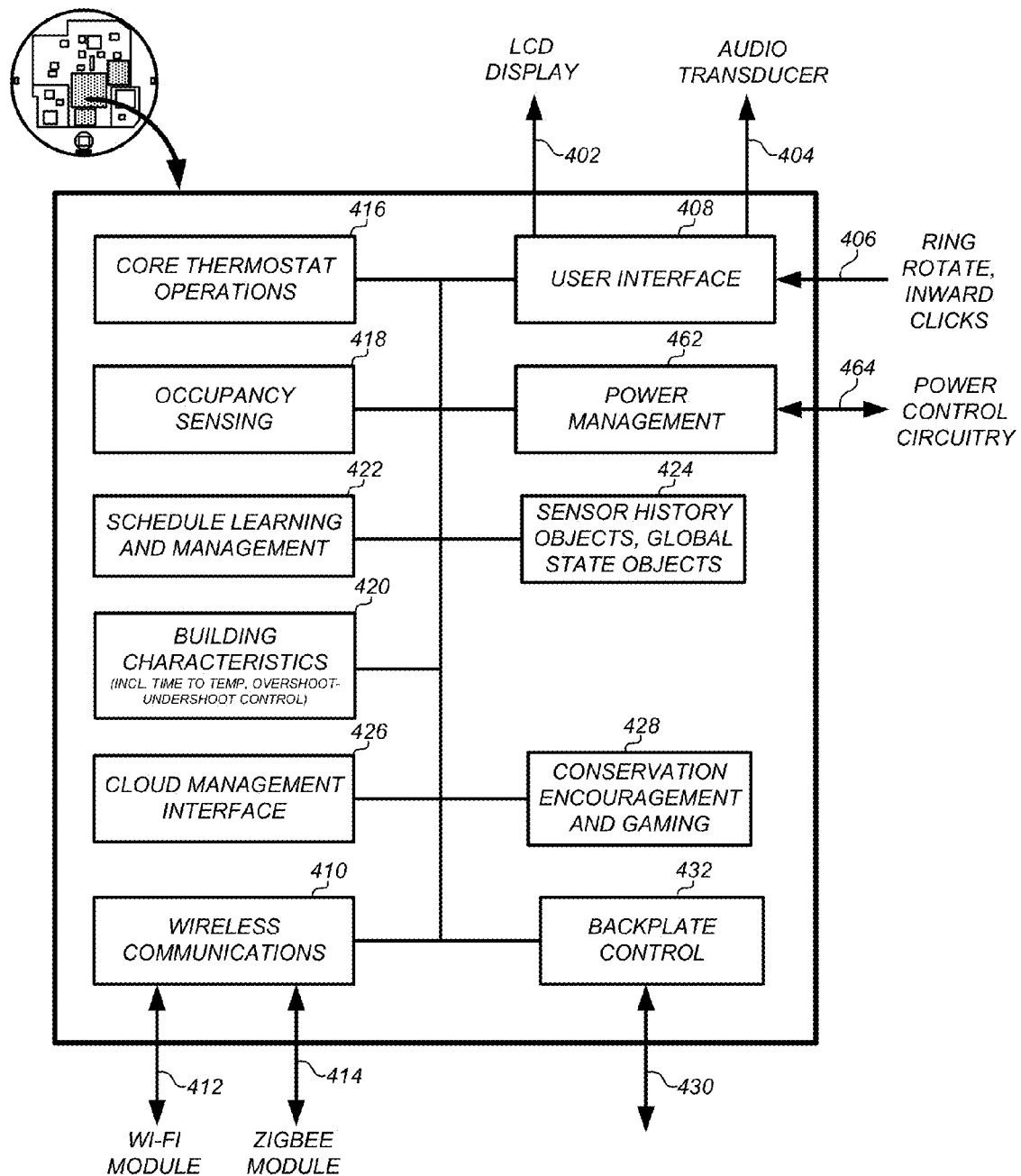
FIG. 4A illustrates a simplified functional block diagram for a head unit, according to one embodiment.

In addition to physical divisions within the thermostat that simplify installation process, the thermostat may also be divided functionally between the head unit and the backplate. FIG. 4A illustrates a simplified functional block diagram 400a for a head unit, according to one embodiment. The functions embodied by block diagram 400a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 402, an audio system 404, and a manipulation sensor 406 as a part of a user interface 408. The head unit processing function may also facilitate wireless communications 410 by interfacing with various wireless modules, such as a Wi-Fi module 412 and/or a ZigBee module 414. Furthermore, the head unit processing function may be configured to control the core thermostat operations 416, such as operating the HVAC system. The head unit processing function may further be configured to determine or sense occupancy 418 of a physical location, and to determine building characteristics 420 that can be used to determine time-to-temperature characteristics. Using the occupancy sensing 418, the processing function on the head unit may also be configured to learn and manage operational schedules 422, such as diurnal heat and cooling schedules. A power management module 462 may be used to interface with a corresponding power management module on the back plate, the rechargeable battery, and a power control circuit 464 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 424. The one or more memories may be integrated with the processing function, such as a flash memory or RAM memory available on many commercial microprocessors. The head unit processing function may also be configured to interface with a cloud management system 426, and may also operate to conserve energy wherever appropriate 428. An interface 432 to a backplate processing function 430 may also be included, and may be implemented using a hardware connector.

Figure 4B:
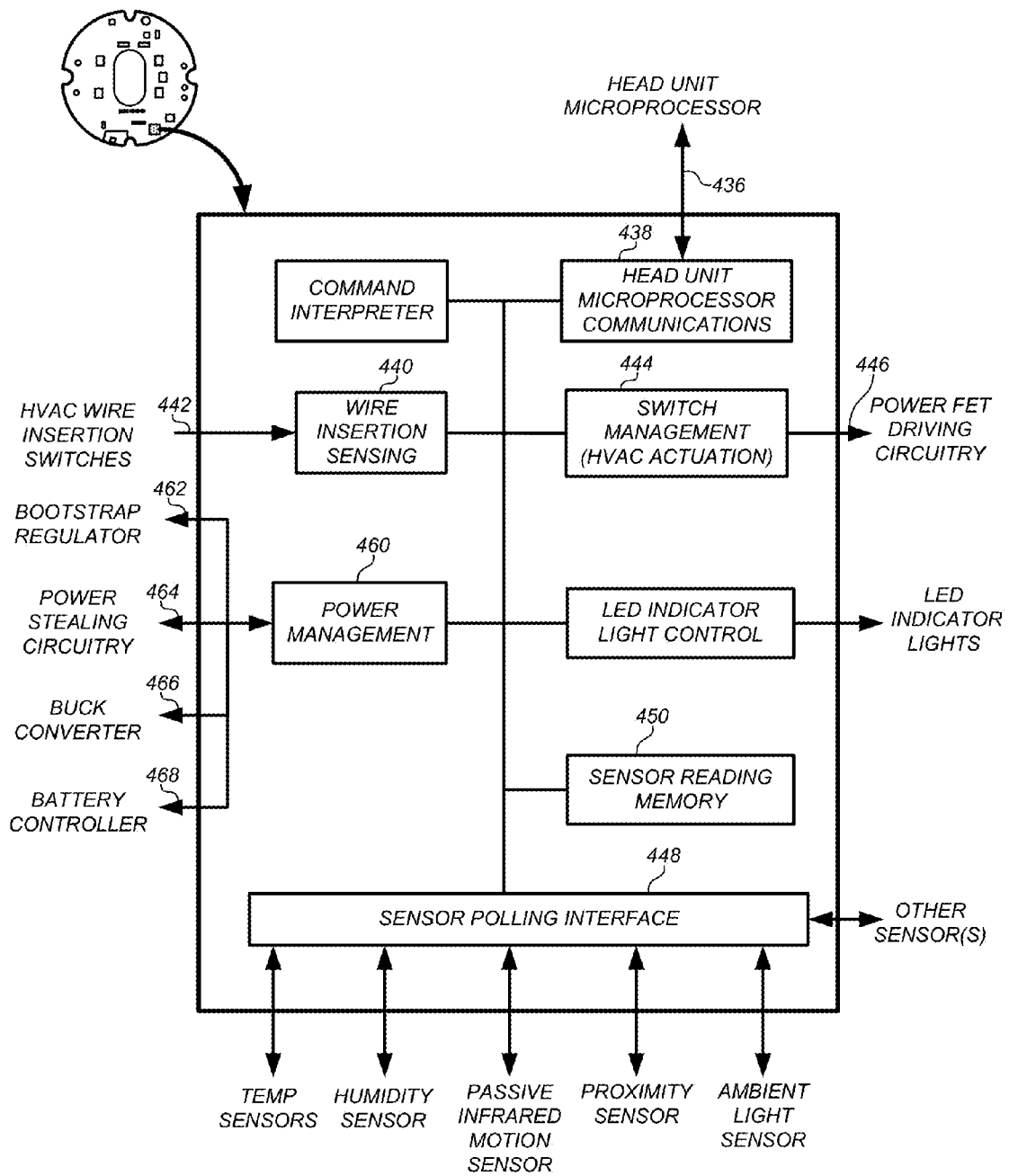
FIG. 4B illustrates a simplified functional block diagram for a backplate, according to one embodiment.

FIG. 4B illustrates a simplified functional block diagram for a backplate, according to one embodiment. Using an interface 436 that is matched to the interface 432 shown in FIG. 4A, the backplate processing function can communicate with the head unit processing function 438. The backplate processing function can include wire insertion sensing 440 that is coupled to external circuitry 442 configured to provide signals based on different wire connection states. The backplate processing function may be configured to manage the HVAC switch actuation 444 by driving power FET circuitry 446 to control the HVAC system.

The backplate processing function may also include a sensor polling interface 448 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 448 may be communicatively coupled to a sensor reading memory 450. The sensor reading memory 450 can store sensor readings and may be located internally or externally to a microcontroller or microprocessor.

Finally, the backplate processing function can include a power management unit 460 that is used to control various digital and/or analog components integrated with the backplate and used to manage the power system of the thermostat. Although one having skill in the art will recognize many different implementations of a power management system, the power management system of this particular embodiment can include a bootstrap regulator 462, a power stealing circuit 464, a buck converter 466, and/or a battery controller 468.

Figure 5:
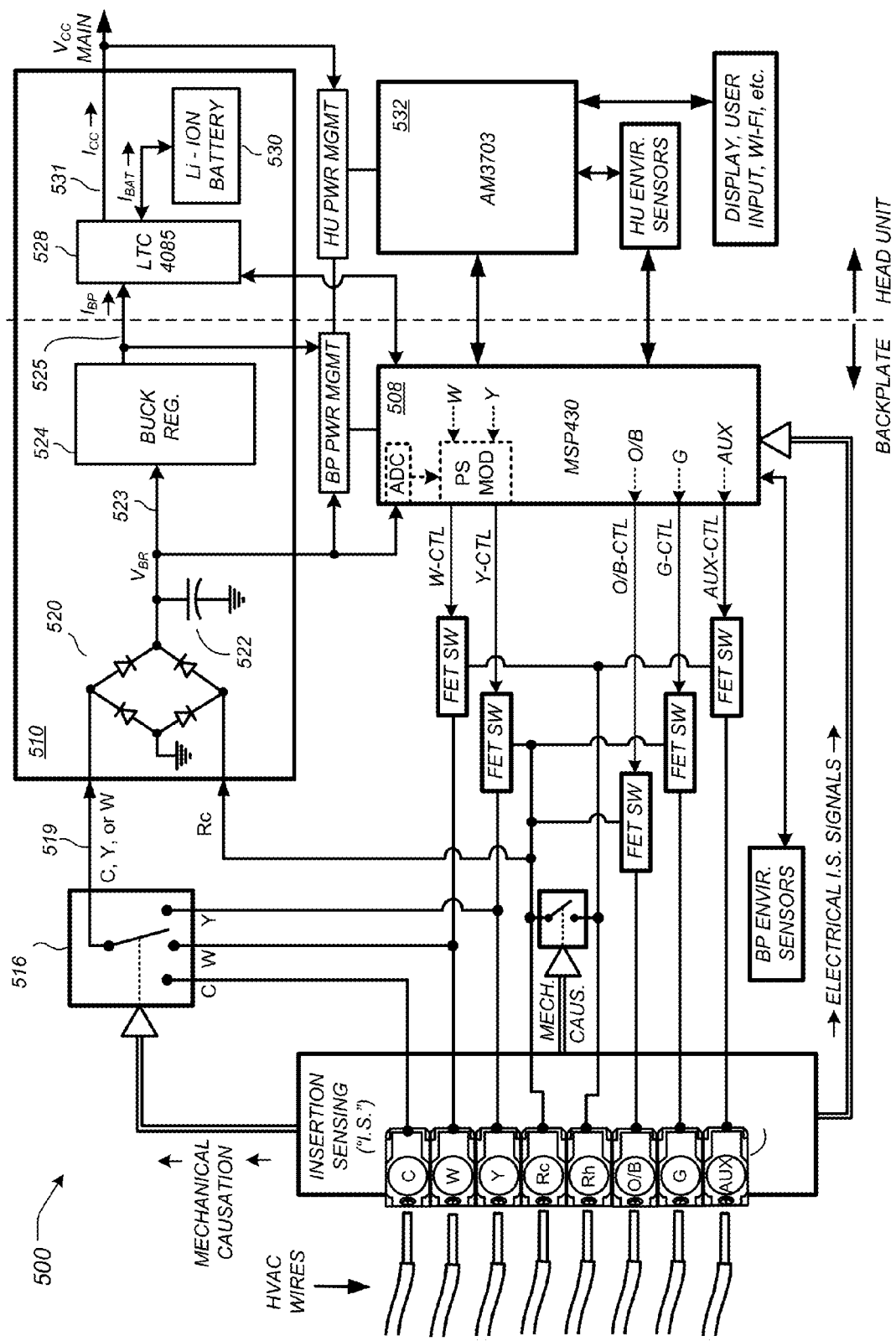
FIG. 5 illustrates a simplified circuit diagram of a system for managing the power consumed by a thermostat, according to one embodiment.

FIG. 5 illustrates a simplified circuit diagram 500 of a system for managing the power consumed by a thermostat, according to one embodiment. The powering circuitry 510 comprises a full-wave bridge rectifier 520, a storage and waveform-smoothing bridge output capacitor 522 (which can be, for example, on the order of 30 microfarads), a buck regulator circuit 524, a power-and-battery (PAB) regulation circuit 528, and a rechargeable lithium-ion battery 530. In conjunction with other control circuitry including backplate power management circuitry 527, head unit power management circuitry 529, and the microcontroller 508, the powering circuitry 510 can be configured and adapted to have the characteristics and functionality described herein below.

By virtue of the configuration illustrated in FIG. 5, when there is a "C" wire presented upon installation, the powering circuitry 510 operates as a relatively high-powered, rechargeable-battery-assisted AC-to-DC converting power supply. When there is not a "C" wire presented, the powering circuitry 510 operates as a power-stealing, rechargeable-battery-assisted AC-to-DC converting power supply. The powering circuitry 510 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 510 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 510 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 530. In other words, when the thermostat is engaged in operations, such as when the electronic display is in an active display mode, power may be supplied by both power stealing and the rechargeable battery 530. In order to preserve the power stored in the rechargeable battery 530, and to give the rechargeable battery 530 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 530. In this embodiment, the backplate processing function 508 (MSP430) can be configured to monitor the environmental sensors in a low-power mode, and then wake the head unit processing function 532 (AM3703) when needed to control the HVAC system, etc. Similarly, the backplate processing function 508 can be used to monitor sensors used to detect the closeness of a user, and wake the head unit processing system 532 and/or the electronic display when it is determined that a user intends to interface with the thermostat.

It will be understood by one having skill in the art that the various thermostat embodiments depicted and described in relation to FIGS. 1-5 are merely exemplary and not meant to be limiting. Many other hardware and/or software configurations may be used to implement a thermostat and the various functions described herein below, including those described in described in U.S. Ser. No. 13/624,881 (Ref. No. NES0233-US), supra, and U.S. Ser. No. 13/624,811 (Ref. No. NES0232-US), supra. These embodiments should be seen as an exemplary platform in which the following embodiments can be implemented to provide an enabling disclosure. Of course, the following methods, systems, and/or software program products could also be implemented using different types of thermostats, different hardware, and/or different software.

Auto Dehumidifier Using a Cooling Function

Embodiments described herein are directed towards thermostats configured to use the cooling function of an HVAC system to dehumidify an enclosure in the absence of a dedicated dehumidifier. In warm and humid environments, mold has a tendency to grow while homeowners are away and the air within the enclosure becomes warm and stagnant. The EPA recommends indoor humidity levels to be below 60%, and ideally less than 50%. However, dehumidifiers are not a common feature in many household HVAC systems. Mold can be particularly problematic in vacation homes that go unoccupied for long periods of time and where homeowners tend to set their away setpoint temperature relatively high. Even in occupied homes, homeowners may set their thermostats to maintain warmer temperatures and thus unknowingly promote the growth of hazardous mold. Other issues may arise as would be apparent to a person skilled in the art in view of the present teachings.

In some embodiments, activating the cooling function of an HVAC system can reduce the risk of mold without requiring a dedicated dehumidifier by reducing the ambient air temperature and promoting air circulation throughout the enclosure. Users can activate an auto dehumidifier function configured to monitor the humidity of the enclosure and operate the cooling function of the HVAC system in an attempt to lower the ambient humidity. Generally, the auto dehumidifier function may cause the cooling function of the HVAC system to operate more often than it normally would. Therefore, users can choose to accept the trade-off between additional cooling costs and the potential benefits of mold prevention. Users may be provided with an interface showing the increased energy usage attributable to the auto dehumidifier feature. A user interface of the thermostat may also indicate when the thermostat is using the cooling function to reduce humidity rather than to reach a setpoint temperature.

The auto dehumidifier feature may use a humidity sensor to detect times where the humidity of the enclosure exceeds a threshold. When the threshold is exceeded, the thermostat may activate the cooling function of the HVAC system for a time interval in an attempt to lower the humidity level. The length of a dehumidification cycle using the cooling function, as well as the length of delays between dehumidification cycles may be determined using a set of conditions based on user preferences and a determined occupancy status. The determined occupancy status may include a long-term away status when the enclosure is expected to be unoccupied for a relatively long time interval. The determined occupancy status may also include an occupied status when the enclosure is currently occupied, has recently been occupied, and/or is expected to be occupied in the near future. The determined occupancy status may be used to set temperature thresholds, humidity thresholds, and time intervals for the auto dehumidifier function.

The thermostat may compare the measured humidity of the enclosure to a humidity threshold based on the occupancy status of the enclosure. A first humidity threshold (e.g. 75%) may be used when the enclosure has an occupancy status of occupied. A second humidity threshold (e.g. 55%) may be used when the enclosure has an occupancy status of long-term away. The enclosure may be cooled more when the enclosure will be unoccupied without causing discomfort to the occupants.

Out of concern for both occupant comfort and energy conservation, the auto dehumidifier feature may limit the amount that it will cool an enclosure below a setpoint temperature even if the humidity threshold has not yet been reached. For example, the auto dehumidifier feature may be deactivated when the temperature drops below the setpoint temperature by a threshold amount. The threshold amount may vary depending on whether the home is occupied (e.g. 3° below the setpoint temperature) or whether the home is unoccupied (e.g. 5° below the setpoint temperature). A floor temperature value may be used below which the auto dehumidifier feature should not operate (e.g. 75° F.). If users turn the thermostat "off" while they are away, the auto dehumidifier may use a predetermined setpoint temperature (e.g. 90° F.).

Because the cooling function of most HVAC systems is not specifically designed to dehumidify an enclosure, there are limits to how effective the auto dehumidifier feature can be. It has been determined that it may be most effective to operate the cooling function repeatedly at regular intervals rather than continuously for an extended period of time. It has been found that humidity is most effectively removed from an enclosure during the first portion of a cooling cycle. Therefore, limiting the length of cooling cycles while increasing the overall number of cooling cycles may reduce the humidity more than would a smaller number of extended cooling cycles. In one embodiment, the auto dehumidifier feature may turn off the cooling function after a first time interval where no significant decrease in the humidity of the enclosure is observed. For example, the auto dehumidifier feature may turn off the cooling function after 30 minutes of continuous cooling without a change in humidity. The auto dehumidifier function may then wait for a second time interval (e.g. 15 minutes) referred to as a backoff period before again attempting to lower the humidity of the enclosure using the cooling function of the HVAC system.

After a number of cycles, the amount by which the humidity level in the enclosure drops with each cycle may begin to decrease. Therefore, some embodiments may include a longer rest interval after a threshold number of cooling cycles. For example, after three cooling cycles followed by rest intervals of approximately 15 minutes each, the auto dehumidifier function may activate a substantially longer rest interval of, for example, approximately 1 hour.

Some thermostats may be equipped with an "Airwave" feature that uses condensation from the condenser coils to further cool an enclosure after the cooling function has been deactivated by the thermostat. Even at low humidity levels, the Airwave feature may dramatically increase humidity levels. When the auto dehumidifier feature is enabled, the Airwave feature may be disabled to avoid introducing additional moisture into the enclosure atmosphere. The Airwave feature and the auto dehumidifier feature may rarely conflict in practice, as the Airwave feature is most effective in hot and dry climates, while the auto dehumidifier feature is most effective in hot and humid climates. The auto dehumidifier function may also be disabled when the thermostat automatically determines using wire insertion sensing that a separate dehumidifier is available as part of the HVAC system of the enclosure. The auto dehumidifier function may also be a disabled when the thermostat is in a heating mode.

The concepts described in this application may be broadly applied to any circumstance where a first device intended to perform a primary function can also be used to perform a secondary function in the absence of a second device specifically intended to perform the secondary function. Because the first device may be efficiency-limited in performing the secondary function, the algorithms described herein may be adapted to set runtimes, thresholds, power levels, delay intervals, and environmental conditions based on measurements and user preferences to perform the secondary function as efficiently as possible. For example, a heat pump for a backyard pool may be used to circulate and purify water periodically. A heater in an automobile may be used to cool the engine when the water pump begins to fail by balancing user comfort with engine safety temperatures. Smart phones designed to eliminate background noise during phone calls may be used to cancel noise while listening to music.

Turning back to the HVAC space, similar algorithms to those discussed herein may be used to control an air purification feature combined with occupancy detection. A first algorithm may be performed when the house is occupied, while a second algorithm may be used when the house is unoccupied. Purification thresholds and runtimes could be reduced during unoccupied intervals. Additionally, higher quality HEPA filters could be used while the home is occupied and lower quality filters could be used when the home is unoccupied.

Turning back to embodiments implemented using a thermostat device, it has been determined through empirical data that use of a cooling function of an HVAC system can significantly lower the humidity level of an enclosure when no dedicated dehumidifier is available.

Figure 6:
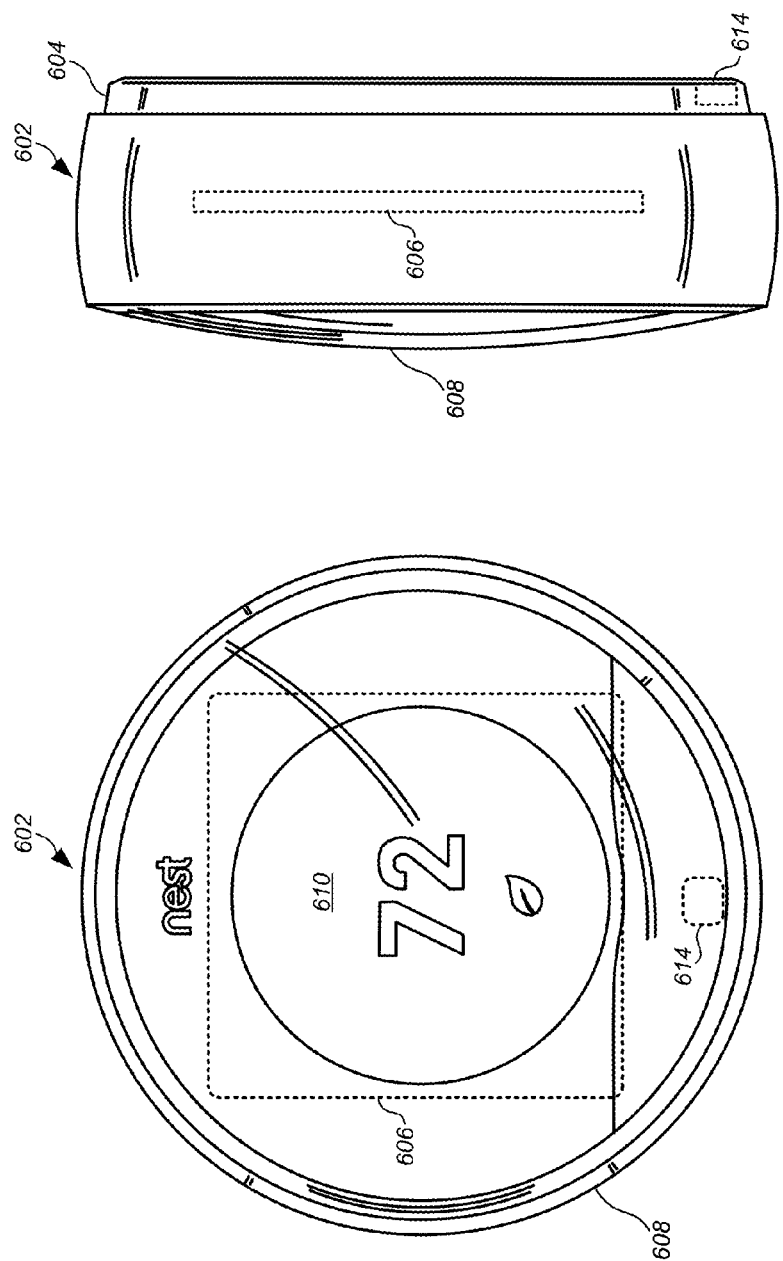
FIG. 6 illustrates various views of an exemplary thermostat, according to some embodiments.

FIG. 6 illustrates various views of an exemplary thermostat, according to some embodiments. This thermostat may include a housing 608, a user interface 610, one or more temperature sensors configured to provide temperature sensor measurements, and a humidity sensor 614 configured to provide humidity sensor measurements. The thermostat may also include an occupancy sensing system that characterizes an occupancy status of an enclosure in which the thermostat is installed. The occupancy status may be selected from a plurality of possible occupancy statuses including an occupied state and an away state.

The thermostat may also include a processing system disposed within the housing 608. The processing system may be in operative communication with the one or more temperature sensors to receive the temperature sensor measurements. The processing system may also be in operative communication with one or more input devices that may include the user interface for determining a setpoint temperature. The processing system may also be in operative communication with the HVAC system of the enclosure. The processing system may be configured to control the HVAC system based at least in part on the setpoint temperature and the temperature sensor measurements.

As described above, the thermostat may include two modular sections referred to as a head unit and a backplate 604. In some embodiments, the humidity sensor 614 may be located in the backplate 604. In other embodiments (not shown), the humidity sensor 614 may be installed on a circuit board 606 located in the head unit. In some embodiments, the humidity sensor 614 may be combined with a temperature sensor. This additional temperature sensor may be used by ambient temperature determination algorithms in order to compensate for internal heating effects caused by the thermostat electronics and/or user interface, along with heating effects caused by exposure to direct sunlight for limited periods of time. In one implementation the humidity sensor 614 may be implemented using the SHT20 digital humidity sensor chip available from Sensirion®.

Figure 7:
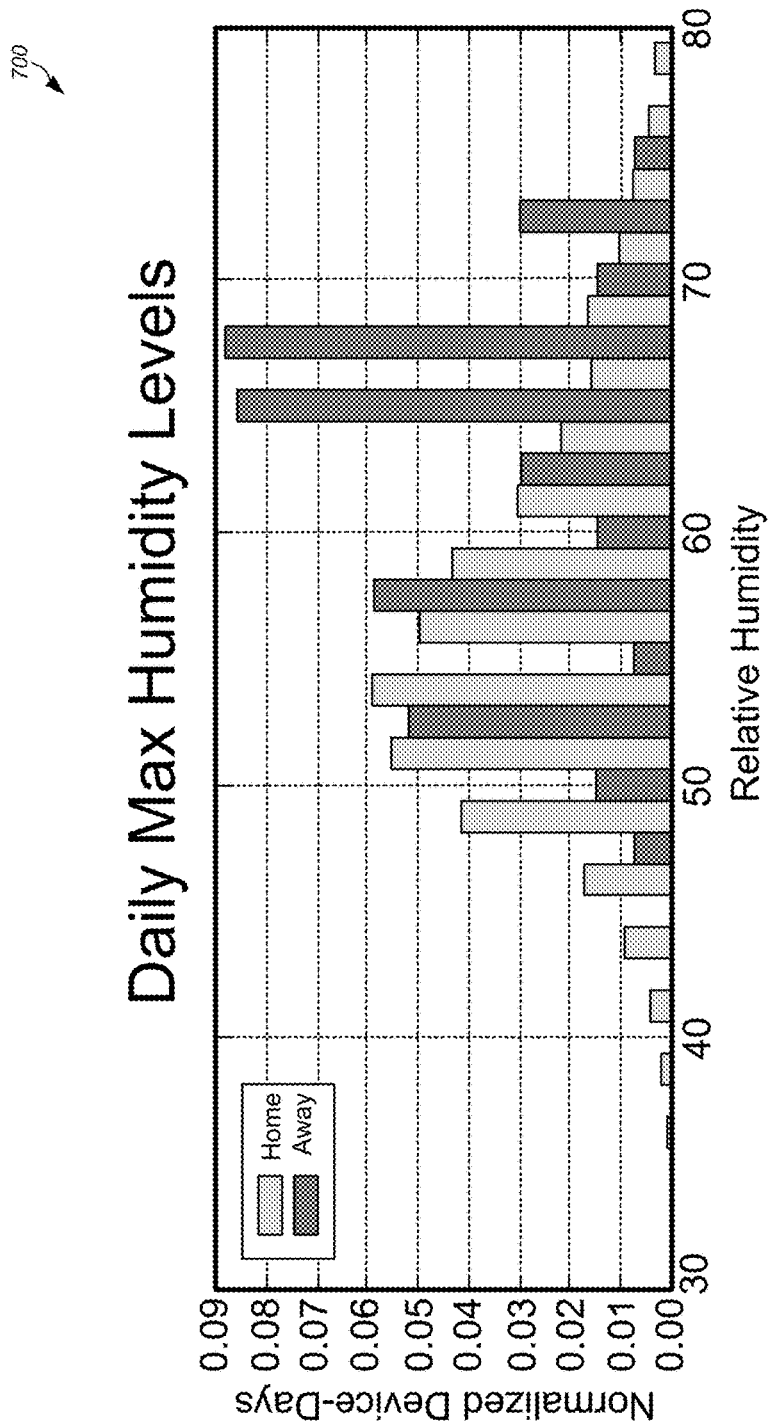
FIG. 7 illustrates a graph of humidity levels for thermostat devices in Florida during the month of August 2012.

FIG. 7 illustrates a graph 700 of humidity levels for 500 thermostat devices in Florida during the month of August 2012. Graph 700 is a histogram of daily maximum humidity levels measured within each of the enclosures under observation. The lighter bars represent values measured when the thermostat detected that the home was unoccupied within the past 48 hours. In contrast, the darker bars represent measurements taken when the thermostat determined that the enclosure was not occupied within the last 48 hours. Each of these homes does not have a dedicated dehumidifier accompanying the air conditioner.

The results of the data displayed in graph 700 indicate a number of useful observations. First, the average maximum humidity level is significantly higher in unoccupied enclosures. For example, the average maximum humidity level for occupied enclosures is 57.0%, while the average maximum humidity level for unoccupied enclosures was 61.1%. Second, the distribution of graph 700 indicates that most of the daily maximum humidity levels were between approximately 50% and 60% in occupied enclosures. In contrast, a large percentage of the daily maximum humidity levels were centered between approximately 60% and 70% in the unoccupied enclosures. This indicates a large number of enclosures were subject to maximum humidity levels that far exceeded the EPA's maximum humidity recommendation of between 55% and 60%.

Finally, because the homes under observation did not have a dedicated dehumidifier, graph 700 indicates that humidity levels may be significantly controlled using the intermittent operation of a cooling function primarily used to control temperature. In graph 700, unoccupied enclosures typically set their temperature setpoint higher while the home is unoccupied. Therefore, the cooling function did not operate as often, and as a result the maximum humidity levels rose dramatically inside the enclosure. However, when the enclosures were occupied, the temperature setpoint was typically set lower, causing the cooling function to operate more often. This in turn led to a more controlled level of maximum humidity inside the enclosure while the enclosure was occupied.

As used herein, the term "cooling function" may be used to describe any operation of the HVAC system primarily configured to reduce a temperature within an enclosure. Most often, a cooling function will include an air conditioner that uses a fan, a compressor, and cooling coils to force cooled air into the enclosure. Additionally, a cooling function may include the operation of a fan without a compressor and cooling coils. Depending on the particular climate, season, and/or region, the cooling function of an HVAC system may further include other types of cooling systems that would be known to one having skill in the art.

Figure 8:
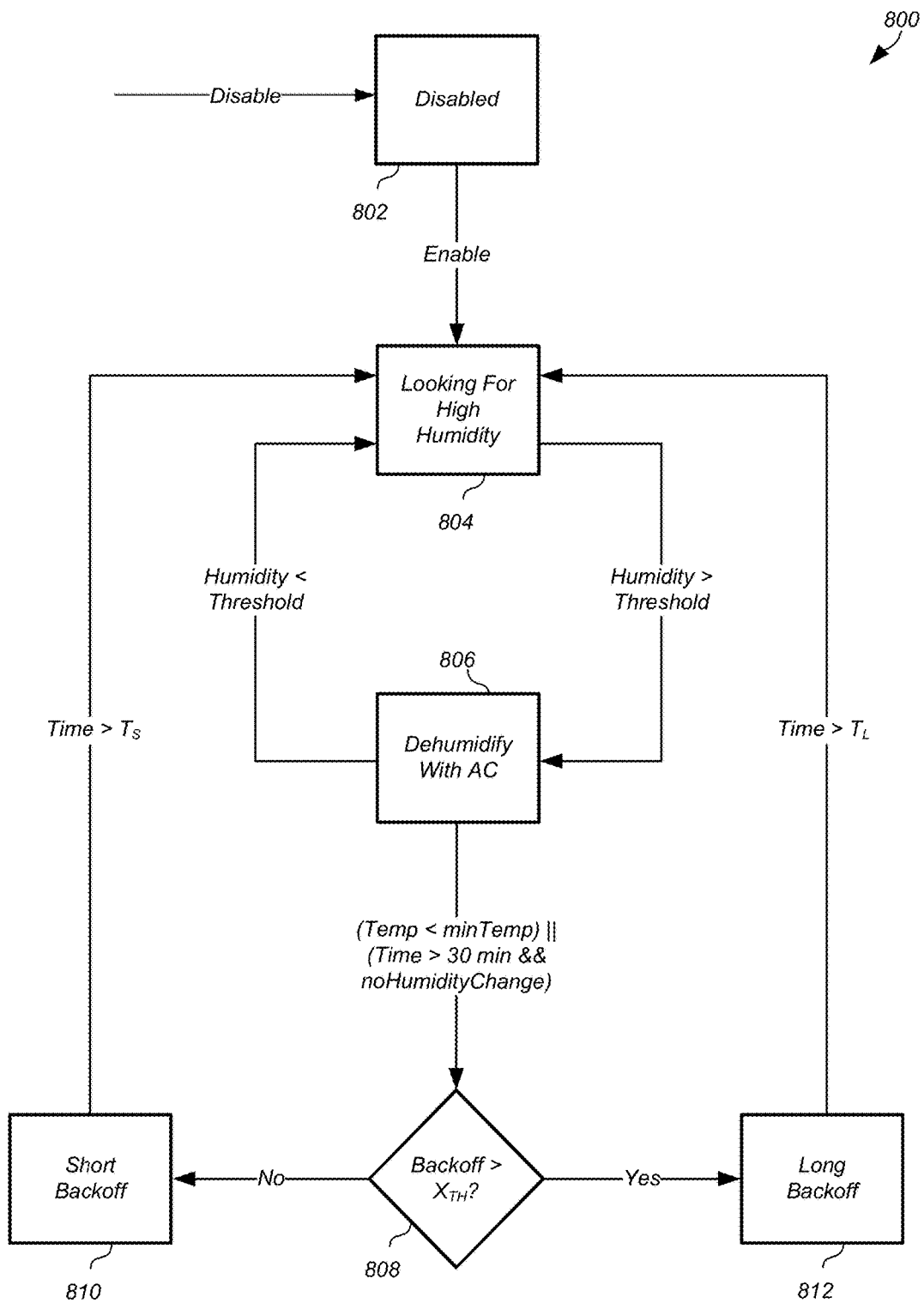
FIG. 8 illustrates a flowchart of a method for reducing a humidity level in an enclosure using a cooling function, according to some embodiments.

FIG. 8 illustrates a flowchart 800 of a method for reducing a humidity level in an enclosure using a cooling function, according to some embodiments. Flowchart 800 may be considered a generic algorithm for which the various thresholds, time intervals, and operations may be varied according to an occupancy status of an enclosure. In some embodiments, flowchart 800 may describe what may be presented to a user as an "auto dehumidifier feature." The user may be given the opportunity to choose to enable or disable the auto dehumidifier feature according to their own comfort level preference and energy-saving concerns. Therefore, in one embodiment, the algorithm may begin in a disabled state 802 until a command is received to enable the auto dehumidifier feature. The command may be received from a user through a user interface of the thermostat or through a remote interface on a portable computing device such as a laptop, tablet computer, and/or smart phone. The command may also be received from a central monitoring station that is communicatively coupled through a wireless connection to the thermostat. In other embodiments (not shown), the algorithm may begin in an enabled state by default instead of being specifically enabled through a command.

Once the auto dehumidifier feature is enabled, either through command or by default, the algorithm may enter state 804 and begin looking for a high level of humidity. As described above, the thermostat may include a humidity sensor that provides humidity sensor measurements to the processing system of the thermostat. The processing system may compare the humidity sensor measurements to one or more humidity thresholds. The humidity thresholds may vary according to various modes of operation. In one embodiment, the humidity thresholds may vary according to an occupancy status of the enclosure. Various occupancy statuses of the enclosure and their effects upon the algorithm flowchart 800 are described in greater detail below.

When the humidity level in the enclosure exceeds the humidity threshold, the algorithm may transition into state 806 to begin dehumidifying the enclosure using a cooling function, such as an air conditioner. In some cases, the cooling function may already be operating in order to reduce a temperature of the enclosure. In these cases, state 806 may simply continue allowing the cooling function to operate. If the temperature drops below the temperature setpoint that would normally cause the cooling function to stop operating, state 806 may cause the cooling function to continue operating in order to dehumidify the enclosure. In other cases, the temperature of the enclosure may already be at or below the setpoint temperature of the thermostat. In these cases, state 806 may cause the cooling function to operate in order to further dehumidify the enclosure. In other words, the auto dehumidification feature may cause the cooling function to operate at times when it normally would not, and to operate for longer time intervals than it normally would.

In order to transition out of state 806, one or more of a set of conditions may be met. As used herein, a "set of conditions" may include any parameters used to control the cooling function. The set of conditions may include information associated with temperature thresholds, humidity thresholds, time intervals, occupancy statuses, user preferences, energy usage, date and time, user profiles, and/or the like that can be used to control when the auto dehumidification features operates the cooling function of the HVAC system. The set of conditions may be dynamically adjusted using environmental measurements or communications received from a central monitoring facility or a user device.

For example, the algorithm may transition out of state 806 when the measured humidity level in the enclosure exceeds a humidity threshold. The humidity threshold used to transition out of state 806 may be related to the humidity threshold used to transition into state 806 and may also be determined based on an occupancy status of the enclosure and/or user preferences. For example, a target humidity level may be 55%. This target humidity level may include a maintenance band, or hysteresis, to prevent rapid transitions between states. For example, a maintenance band of 6% may be used. This would yield an upper humidity threshold of 58% to enter into state 806 and a lower humidity threshold of 52% in order to leave state 806.

Some embodiments may also adjust the humidity threshold based on an occupancy status of the enclosure. For example, it may be determined that a particular enclosure seals out humidity when the enclosure is unoccupied and doors/windows are not being opened/closed on a regular basis. It may be a more efficient use of the cooling function to begin dehumidifying at a higher level of humidity and allow the algorithm a flowchart 800 to operate continuously until a humidity threshold much lower than the high level of humidity is achieved. In contrast, it may be more effective to operate with a smaller maintenance band when the home is occupied in order to maintain a more constant level of humidity for user comfort.

In some embodiments, a target humidity threshold may be set to approximately 55% when the enclosure is unoccupied. In other embodiments, the target humidity threshold may be set to approximately 60%. In contrast, when the enclosure is occupied the target humidity threshold they be set significantly above 55%. For example, the target humidity threshold may be set to 65%, 70%, 75%, 80%, and/or the like.

In some embodiments, the set of conditions for exiting state 806 may also include temperature considerations. Even though the cooling function is operating primarily to dehumidify the enclosure rather than to lower the temperature, the temperature will still be lowered as the cooling function continues to operate. In order to balance user comfort and energy considerations with the benefits of dehumidification, it may be determined that excessive cooling should be avoided. Therefore, some embodiments may also compare the measured temperature during a dehumidification cycle to a minimum temperature and transition out of state 806 when the minimum temperature threshold is violated.

The minimum temperature may be based on the occupancy status of the enclosure as detected by the thermostat. In some embodiments, the minimum temperature may be a number of degrees below the setpoint temperature. For example, when the enclosure is occupied, user comfort may dictate that the auto dehumidification feature not cool the enclosure more than approximately 3° below the setpoint temperature. When the enclosure is unoccupied and user comfort may not be the primary concern, the auto dehumidification feature may be allowed to cool the enclosure farther below the setpoint temperature. For example, the dehumidification feature may cool the enclosure to approximately 5° below the setpoint temperature. When the enclosure is unoccupied, effective dehumidification may be more of a concern than user comfort. However, assuming that the enclosure will eventually become occupied again, user comfort may also dictate that the enclosure temperature should not be cooled excessively.

Additionally, minimum and/or maximum temperatures may also be used. In some cases, the users may turn off the cooling function or may set the setpoint temperature very high after they leave the house. For example, a homeowner may set the thermostat setpoint temperature to 95° and activate the auto dehumidification feature. In this case, the thermostat may use a maximum temperature of 90° in order to determine a threshold temperature for deactivating the auto dehumidification algorithm. Similarly, an absolute minimum may be used. For example, a minimum of 75° may be used by the algorithm as a threshold temperature below which the auto dehumidification feature should not cool. For example, if a user were to set the setpoint temperature very close to the minimum temperature, the auto dehumidification algorithm would cool until the minimum temperature was reached rather than the threshold temperature below the setpoint temperature that would otherwise be dictated by the algorithm under normal conditions.

Some embodiments may also include a time interval in the set of conditions for exiting state 806. For example, an absolute time interval may be used, such that the cooling function will only be operated for a maximum length of time, such as one hour. In other embodiments, humidity sensor measurements may be periodically monitored to determine when a predetermined time interval is exceeded wherein the measured humidity does not substantially change. For example, the algorithm may transition out of state 806 when, for example, 30 minutes have passed without any significant change in the humidity of the enclosure.

Note that according to flowchart 800, there are two ways to exit state 806. When the humidity level in the enclosure is the reason for leaving state 806, flowchart 800 may transition back into state 804 and again watch for the measured humidity to exceed the higher threshold. Alternatively, if the algorithm transitions out of state 806 due to conditions that are not generally related to the measured humidity, the algorithm may instead transition into decision block 808. These types of conditions may indicate that even though the desired humidity level has not yet been reached, there may be some benefit to stopping the cooling function periodically. These benefits may be related to user comfort, efficiency, and/or energy and cost savings.

For example, when operating the cooling function in order to dehumidify the enclosure, the temperature may decrease too far below the setpoint temperature. It may be necessary to allow the enclosure temperature to recover without significantly increasing the humidity. Additionally, when operating the cooling function for an extended period time, it may reach a point where it is no longer efficiently removing humidity from the enclosure. Continuously running the cooling function without removing significant humidity may not be cost effective. Therefore, it may be determined that the efficiency of the auto dehumidification feature may be increased by instituting backoff intervals where the cooling function is allowed to recover such that it may more effectively remove humidity during the next cooling cycle. The rationale and operation of the backup intervals will be described in greater detail below.

At decision block 808, the number of consecutive dehumidification cooling cycles may be compared to a threshold number. If the number of dehumidification cooling cycles exceeds the threshold number, a longer backoff interval may be used. The longer backoff interval may be substantially longer than the shorter backoff interval. In some embodiments, the longer backoff interval may be at least four times as long as the short backoff interval. For example, the short backoff interval may be approximately 15 minutes in some embodiments, while the long backoff interval may be approximately 1 hour. In one embodiment, the threshold number of consecutive dehumidification cooling cycles may be approximately three cycles. In other words, after three consecutive dehumidification cooling cycles separated by short backoff intervals, the third backoff interval may be implemented in order to reset the operation of the auto dehumidification feature, as will be described below. The lengths of the backoff intervals and the number of dehumidification cycles between backoff intervals may vary for each thermostat type and enclosure.

Again, it should be emphasized that the various humidity thresholds, temperature thresholds, backoff interval thresholds, backoff interval lengths, and/or the like, may be dependent upon user preferences as well as an occupancy status of the enclosure. These values may be determined dynamically according to received data from the sensors of the thermostat, and may be processed or assigned from a central processing location that is in wireless communication with the thermostat.

In some embodiments, flowchart 800 may be governed by two separate sets of conditions, namely a first set of conditions and a second set of conditions. These two sets of conditions include first and second humidity thresholds, respectively. These two sets of conditions may cause the auto dehumidification feature to operate as an "occupancy status sensitive automated dehumidification feature" that includes an occupied-state automated dehumidification algorithm and an away-state automated dehumidification algorithm. These two algorithms may both follow flowchart 800. In some cases these two algorithms may only differ in the values of the conditions used to govern transitions between states.

The occupied-state automated dehumidification algorithm may operate according to combined comfort-and-humidity criteria. These criteria may dictate values for the set of conditions, and may be characterized in that the cooling function is operated to reduce the humidity in the enclosure according to a first set of conditions that are tailored to balance user comfort with humidity reduction. In contrast, the away-state automated dehumidification algorithm may be designed to operate according to away-humidity criteria that may dictate values for another set of conditions, and may be tailored to balance humidity reduction with energy and efficiency concerns.

For some embodiments, the currently described methods may be used in conjunction with an intelligent, network-connected thermostat having one or more occupancy sensors and being configured and programmed to detect a plurality of occupancy statuses of the enclosure. These occupancy statuses may include (i) a "home" or "occupied" status in which it is determined likely that the home is occupied, (ii) an automated away status (or "auto-away" state) in which it is automatically determined based on occupancy sensor readings that the home is likely unoccupied, (iii) a manually invoked away status (or "manual" away) in which an affirmative user entry instructs the thermostat to function at "away" settings regardless of automated occupancy determinations, and (iv) a long-term away status (or "vacation" away state) in which it is determined that the house has likely been unoccupied for an extended time period and therefore is likely to continue to be so unoccupied for the near future. Examples of such intelligent, network-connected thermostats are described in one or more of the following commonly-assigned applications, each of which is incorporated by reference herein: U.S. Ser. No. 13/279,151 filed Oct. 21, 2011 (Ref. No. NES0103-US); and U.S. Ser. No. 13/632,070 filed Sep. 30, 2012 (Ref. No. NES0234-US).

As used herein, the terms occupied or unoccupied/away may be used to indicate one or more of the occupancy statuses described above. In some embodiments, the unoccupied/away state may correspond to the long-term away or vacation away status, with all other statuses corresponding to the occupied state. In some embodiments, the unoccupied/away state may correspond to the auto away status, the manual away status, and the long-term away status, while the occupied state corresponds to the occupied status described above.

Figure 9:
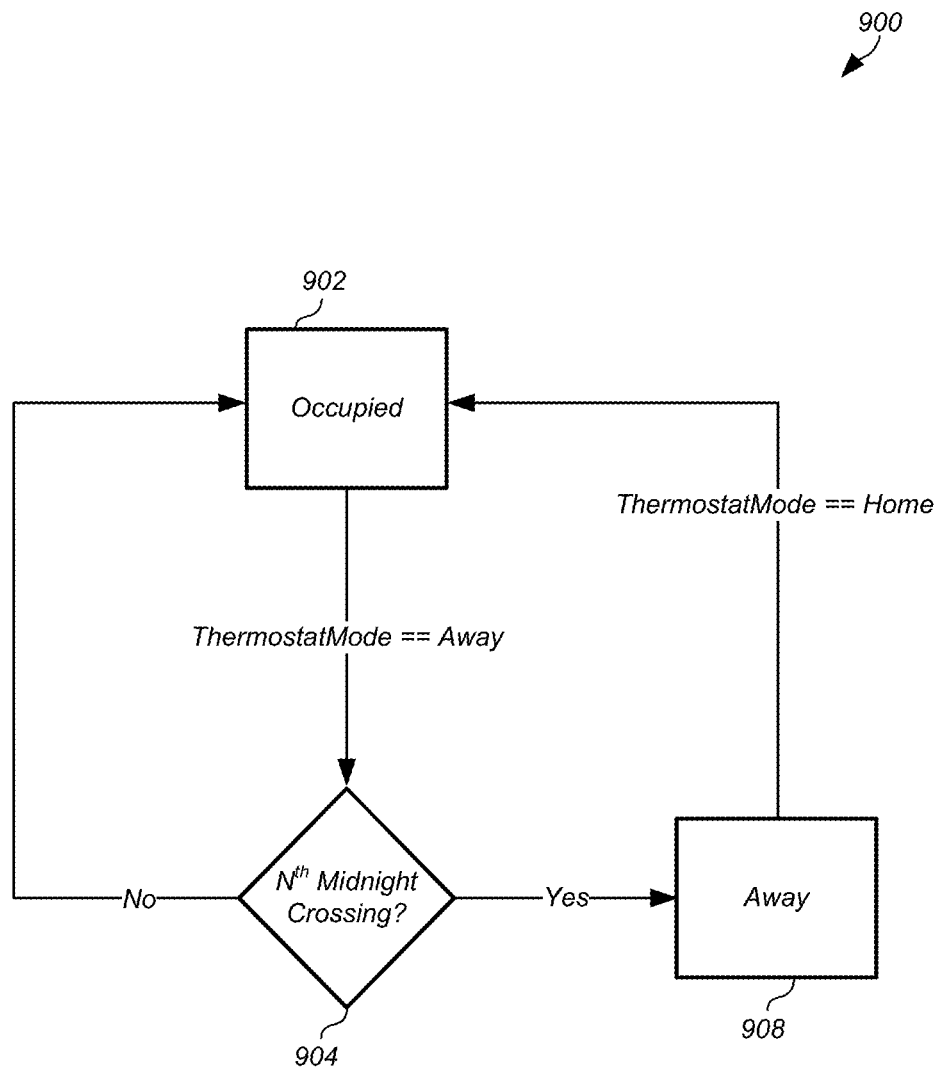
FIG. 9 illustrates a flowchart of a method for turning on the long-term away state, according to some embodiments.

FIG. 9 illustrates a flowchart 900 of a method for turning on the long-term away state, according to some embodiments. In these embodiments, the away-state automated dehumidification algorithm may be configured to operate with the thermostat in the long-term away status (the "away state"), while the occupied-state automated dehumidification algorithm may be configured to operate in the rest of the occupied statuses (the "occupied state").

The algorithm may default to begin in the occupied state 902. The thermostat may then transition into an away status, such as the auto away status detected by the one or more occupancy sensors, or the manual away status as specified by a user. The algorithm may then use an internal clock or a date and time system available through a wireless network in order to count a number of days that have passed since the thermostat entered into the away status. At decision block 904, the thermostat may, for example, count the number of midnight crossings that have occurred since the thermostat went into one of the away statuses. After the $N^{th}$ midnight crossing, the thermostat may transition into a long-term away status. This long-term away status may correspond to the away-state automated dehumidification algorithm. The algorithm may then move into the away state 908, and stay there until the thermostat receives either user inputs or sensor input indicating that a transition should be made back to the occupied state 902.

Note that the algorithm of flowchart 900 uses the long-term away status rather than the auto-away status or the manual-away status to transition to the away-state automated dehumidification algorithm. Alternatively, other embodiments (not shown) may simply transition to the away-state automated dehumidification algorithm when any of the away statuses are indicated by the thermostat. However, using the long-term away status may be more effective at balancing user comfort with energy/efficiency concerns. Many thermostats may enter the auto away state after the enclosure has been unoccupied for a few hours. The excess cooling that may occur using the away-state automated dehumidification algorithm may be uncomfortable for users who intend to return to the enclosure after a few hours.

As described above in relation to flowchart 800, it has been determined that some air conditioning units may have an optimal time interval during which humidity may be removed. First, the air conditioner should be allowed to operate for at least a minimum time interval in order to dehumidify the enclosure. Some air conditioner units may require a warming-up period before they begin removing moisture from the atmosphere. Other air-conditioning units may simply be most efficient during the first portion of an air-conditioning cycle. In either case, it may be most efficient to allow the cooling function to operate for at least the minimum amount of time.

Second, it has been discovered that many air conditioner units may become less effective at removing humidity from the atmosphere of an enclosure after a certain time interval. In other words, allowing the air conditioner to run for more than a maximum time interval may not be an efficient use of the air conditioner to remove humidity.

Figure 10:
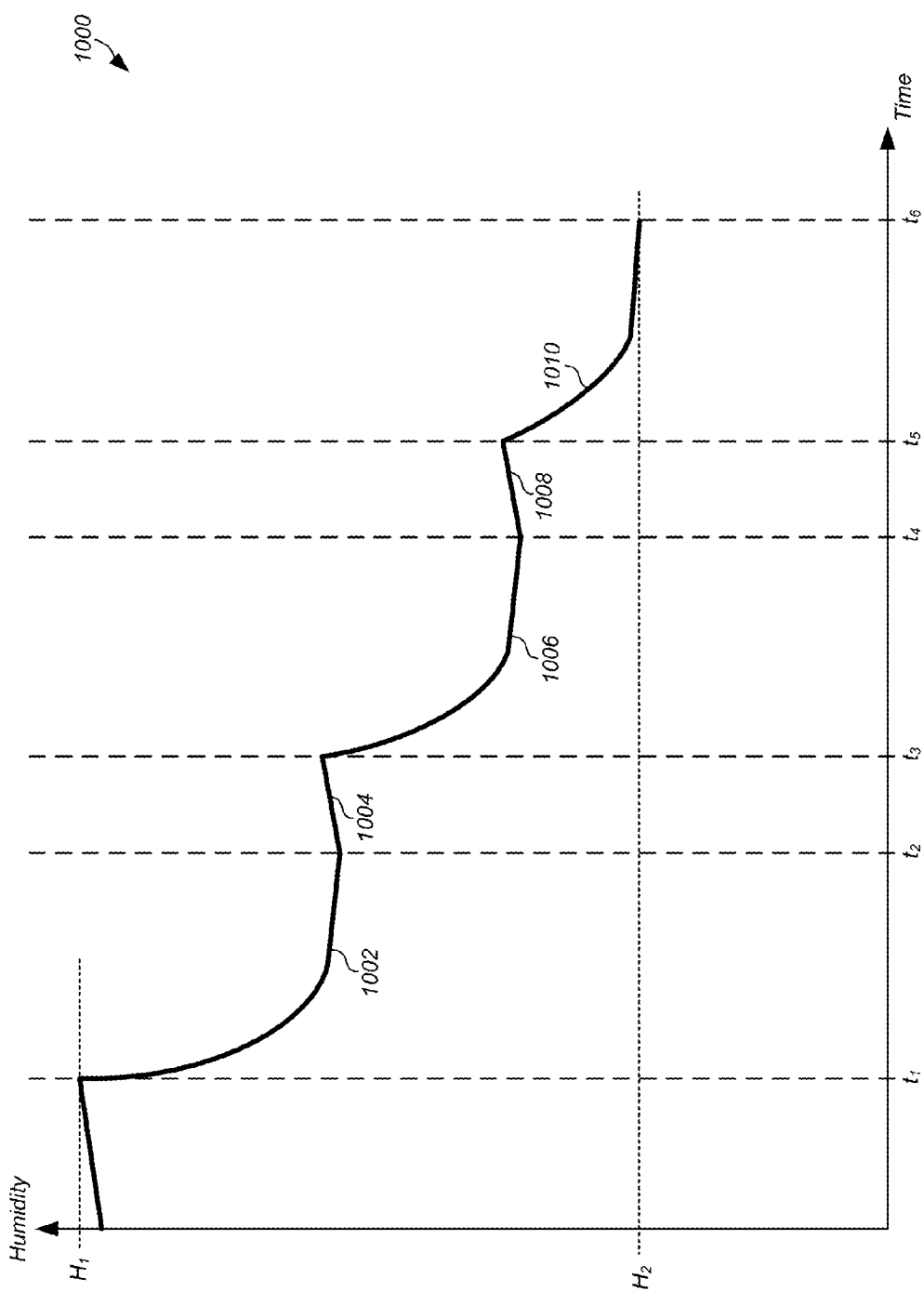
FIG. 10 illustrates a graph of multiple dehumidification cycles using backoff intervals, according to some embodiments.

In order to overcome these problems, the backoff intervals described above may be implemented by various methods described herein to dehumidify an enclosure using the cooling function. FIG. 10 illustrates a graph 1000 of multiple dehumidification cycles using backoff intervals, according to some embodiments. In graph 1000, humidity level $H_1$ and humidity level $H_2$ may correspond to upper and lower humidity maintenance band thresholds that are determined by the occupancy status of the enclosure. When the humidity level reaches the upper threshold of $H_1$, the cooling function may be activated at time $t_1$. Curve 1002 illustrates how this particular air conditioner is most effective at removing humidity from the air during the first portion of the time interval. However, as time progresses the cooling function becomes less efficient at removing humidity, and curve 1002 begins to flatten. At time $t_2$, the auto dehumidification algorithm may then turn off the cooling function. Note that the humidity has not reached the $H_2$ humidity threshold, therefore the cooling function may have instead been deactivated because the temperature descended below the setpoint temperature by more than the threshold value, or because the maximum time interval was reached during which the flat portion of curve 1002 indicated that the humidity of an enclosure was not being significantly reduced.

Curve 1004 may occur during the backoff interval. Note that curve 1004 indicates that the humidity may slightly rise in the enclosure after the cooling function is deactivated. After the backoff interval expires at time $t_3$, the cooling function may again operate to remove humidity from the atmosphere. Curve 1006 is of a similar shape of curve 1002; however, it should be noted that the total humidity reduction of curve 1006 is less than that of curve 1002. Again, at time $t_4$, the cooling function may be deactivated due to either efficiency or temperature conditions, and a second backoff interval may begin characterized by curve 1008. At time $t_5$, a third dehumidification cycle may begin as characterized by curve 1010. Again note that the total humidity reduction of curve 1010 is less than that of both curve 1006 and curve 1002.

Graph 1000 illustrates the fact that there is a time at which a single dehumidification cycle using the cooling function may become inefficient. Graph 1000 also illustrates the fact that repeated dehumidification cycles may also gradually become inefficient. Curve 1010 is significantly flatter than curve 1002. Therefore, repeatedly running dehumidification cycles may eventually limit the effectiveness of the cooling function at reducing enclosure humidity. One solution implemented by some embodiments is to simply increase the time of the backoff intervals between each cycle. However, as illustrated by curve 1004 and curve 1008, the humidity of the enclosure may begin to increase during the backoff intervals.

Alternatively, some embodiments may use a determined number of short backoff intervals followed by a longer backoff interval. The shorter backoff intervals may effectively reduce the humidity over a shorter period of time, while the longer backoff interval may allow the components of the cooling system to reset, condense, and return to a normal temperature. It has been determined that after allowing the air conditioner to "reset" using a longer backoff interval, the dehumidification cycles may restart using shorter backoff intervals at near the original efficiency.

Figure 11:
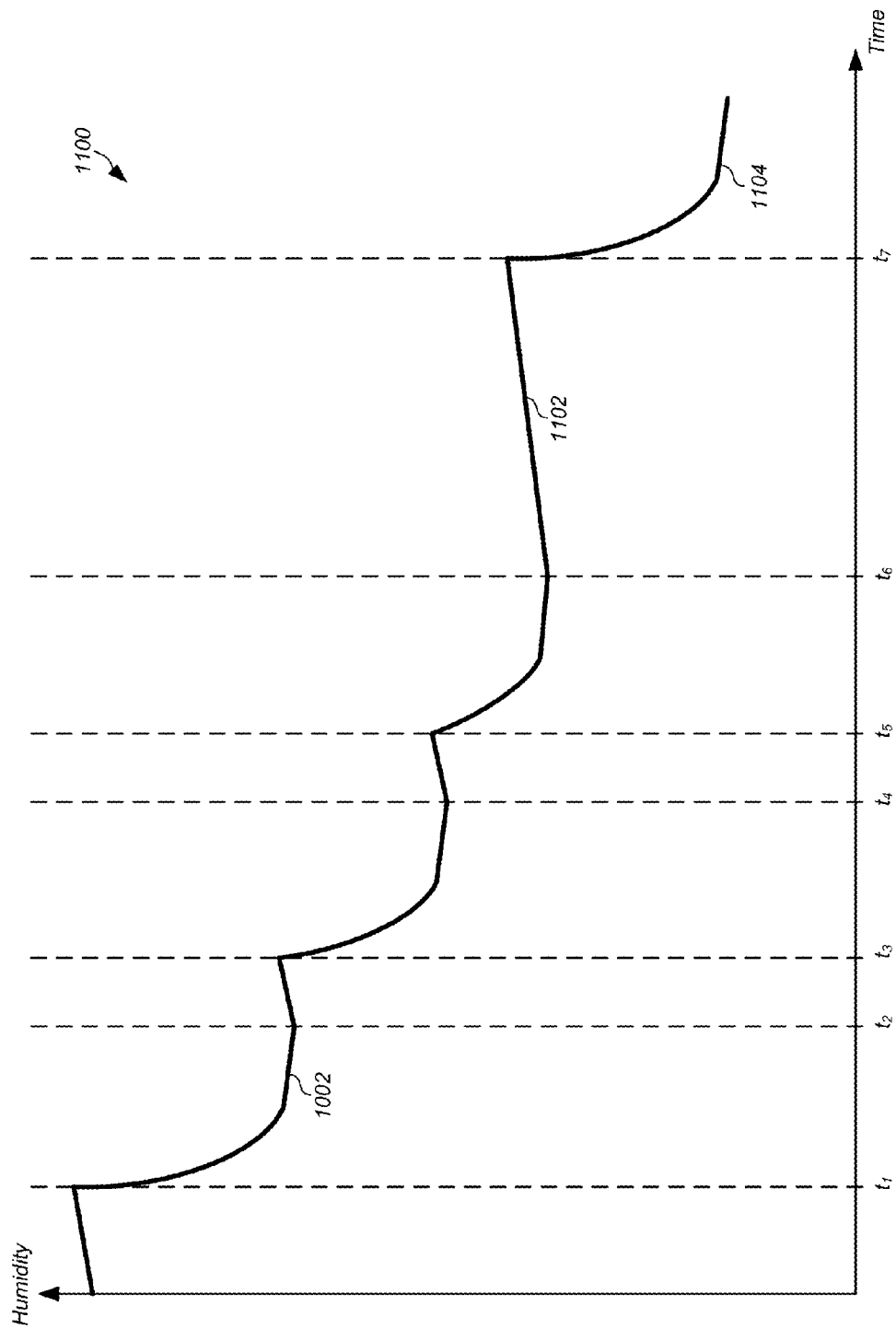
FIG. 11 illustrates a graph of a determined number of dehumidification cycles followed by a longer backoff interval, according to some embodiments.

FIG. 11 illustrates a graph 1100 of a determined number of dehumidification cycles followed by a longer backoff interval, according to some embodiments. The portion of the humidity curve prior to time $t_6$ may be similar to the curve illustrated by graph 1000. At time $t_6$, the thermostat may determine that the threshold number of dehumidification cycles has been reached, and instead of instituting a shorter backoff interval, the longer backoff interval may be used instead. During a longer backoff interval curve 1102 illustrates that the humidity may rise more than during the shorter backoff intervals. However, at time $t_7$ the longer backoff interval may expire, and the dehumidification cycles may be restarted. Note that the humidity curve 1104 of the first new dehumidification cycle is similar in shape to the original curve 1002 of the first original dehumidification cycle. Thus, the longer backoff interval may be effective at restoring near the original efficiency of the cooling function at removing humidity from the enclosure.

Figure 12B:
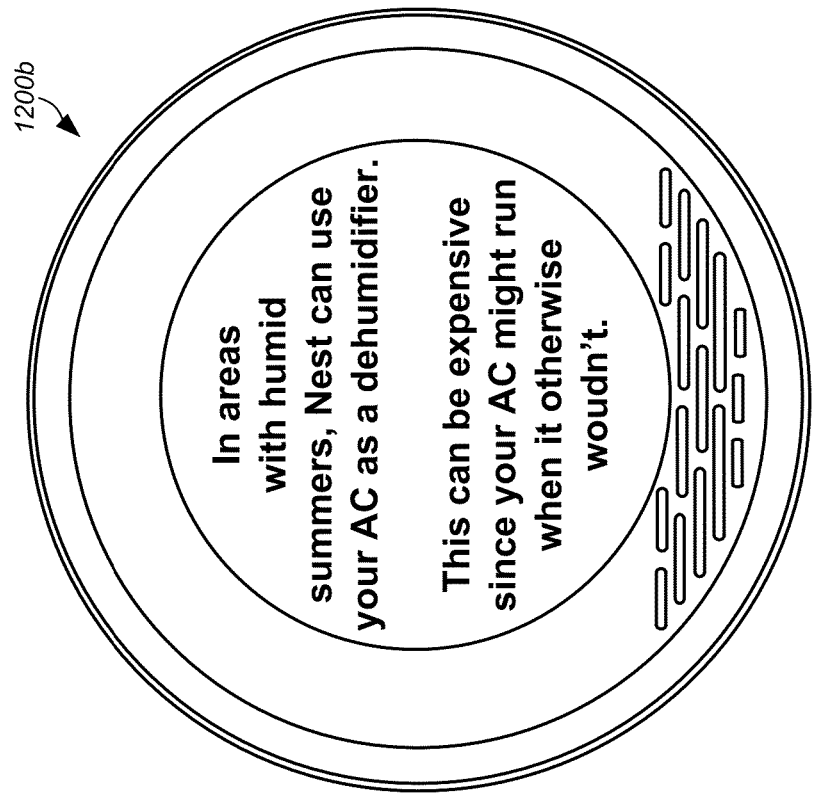
FIG. 12B illustrates a user interface of a thermostat providing additional information regarding the auto dehumidification feature, according to some embodiments.
Figure 12A:
FIG. 12A illustrates a user interface of a thermostat for enabling the auto dehumidification feature, according to some embodiments.

FIG. 12A illustrates a user interface of a thermostat 1200a for enabling the auto dehumidification feature, according to some embodiments. Users may be allowed to turn the auto dehumidifier feature on or off depending upon their concerns for cost savings, energy efficiency, mold prevention, and/or the like. The user interface may provide a message describing the benefits of using the auto dehumidification feature, such as mold prevention. Additionally, the user interface may provide an indication that leaving the auto dehumidification feature off may be more efficient. For example, a leaf symbol 1202 may be displayed next to the "off" setting for the auto dehumidification feature in order to indicate that the disabling the feature may be more energy efficient.

FIG. 12B illustrates a user interface of a thermostat 1200b providing additional information regarding the auto dehumidification feature, according to some embodiments. After receiving an indication from the user interface that the user intends to activate the auto dehumidification feature, additional information may be provided describing the benefits and risks associated with the auto dehumidification feature. For example, the indication may explain that the cooling function of the thermostat may be used as a dehumidifier. The indication may explain that the auto dehumidification feature may cause the cooling function to run when it otherwise would not run, and that this may have an effect on the efficiency of the HVAC system as well as the expense associated with operating the HVAC system.

The user interfaces described above may be presented to a user automatically when certain conditions are detected by the thermostat. In some embodiments, the thermostat may be equipped with a wire insertion sensing unit configured to detect when a dehumidifier is properly connected to the thermostat. The wire insertion sensing unit may use mechanical insertion sensors to physically detect when a wire is connected from an HVAC system dehumidifier to the thermostat. The wire insertion sensing unit may also use electronic tests in order to determine that a dehumidifier is properly connected. During a set up routine of the thermostat, if it is detected that a dehumidifier is not present, then the user interfaces described above may be presented to the user. If a dehumidifier is detected, then the user interfaces described above need not be presented automatically. However, users may be given the option to deactivate the dehumidifier and activate the auto dehumidification feature at their discretion through a menu interface of the thermostat.

Other operating modes and configurations associated with the thermostat may be adjusted when the auto dehumidifier feature is enabled. For example, when the user switches the auto dehumidification feature to the "on" state, an "Airwave" feature may be automatically deactivated. The Airwave feature may use condensation from the air conditioner coils to continue cooling the enclosure after the air conditioner compressor has been deactivated. The Airwave feature may also dramatically increase the humidity in the enclosure. Therefore, enabling the auto dehumidification feature may automatically deactivate the Airwave feature of the thermostat. In some embodiments, the thermostat may also determine whether the thermostat is in a heat mode rather than a cooling mode. The auto dehumidification feature can be automatically deactivated while the thermostat is in the heating mode and automatically reactivated when the thermostat is set to the cooling mode.

Figure 13:
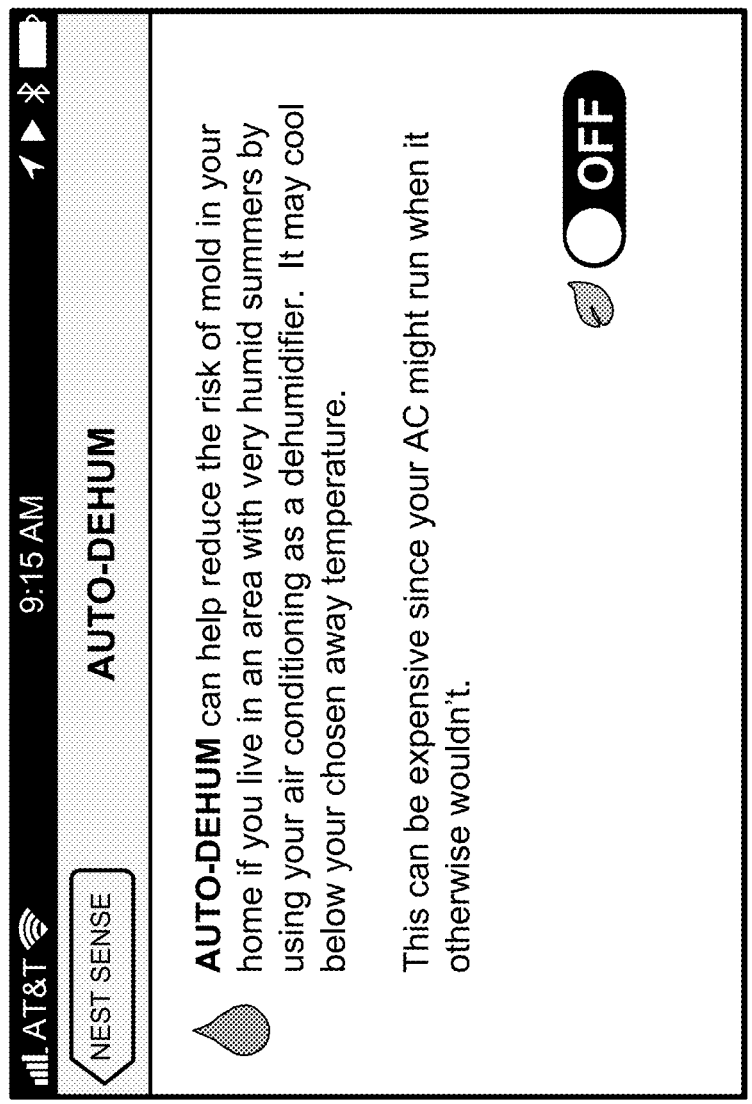
FIG. 13 illustrates a user interface of a user device for activating the auto dehumidification feature, according to some embodiments.

FIG. 13 illustrates a user interface 1300 of a user device for activating the auto dehumidification feature, according to some embodiments. This user interface may be displayed on a smart phone, a tablet computer, a laptop computer, a PDA, a portable music player, a desktop computer, and/or the like. The user device may communicate through the Internet, a local area network, a wide-area network, a private network, or using a dedicated wireless connection with the thermostat. The user interface may provide similar indications as described in relation to FIG. 12A and FIG. 12B that described the costs and benefits associated with the auto dehumidifier feature. The user interface 1300 may also provide indications that easily allow users to choose the most energy-efficient setting, such as the "leaf" icon.

User interface 1300 may be used to activate or deactivate the auto dehumidification feature while away from the enclosure. This may be particularly beneficial to owners of vacation homes. For example, vacation homes in humid areas such as Florida may experience seasonal heat and/or humidity. Owners may be away from vacation homes for extended periods of time. An owner may decide to leave the auto dehumidification feature off during the winter and activate the auto dehumidification feature during the summer without needing to physically visit the vacation home.

Figure 14:
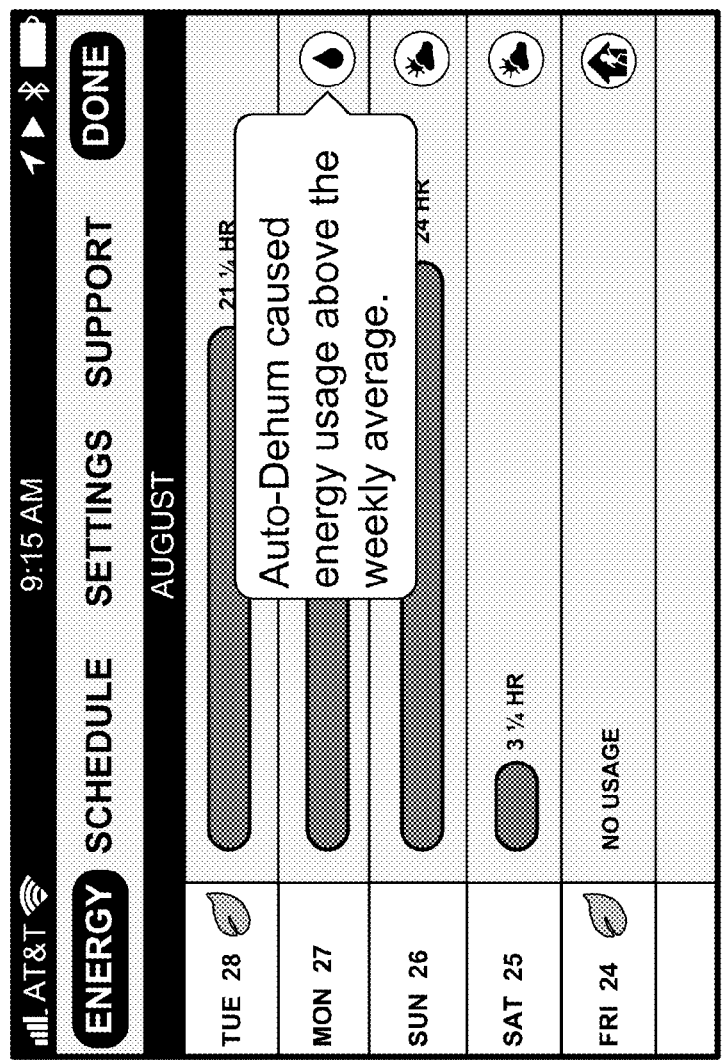
FIG. 14 illustrates a user interface of a user device for assessing the efficiency of an auto dehumidification feature, according to some embodiments.

FIG. 14 illustrates a user interface 1400 of a user device for assessing the efficiency of an auto dehumidification feature, according to some embodiments. User interface 1400 may display various indications that describe how efficiently an HVAC system was used during an extended time interval, such as during one week, during one month, or during a particular season. User interface 1400 may also include an indication that the auto dehumidification feature caused the energy usage in a particular time interval to be above what would normally be expected. User interface 1400 may be beneficial to users to explain outlying energy usage and help users associate a cost that can be balanced with a benefit provided by the auto dehumidifier can feature. Although not shown explicitly, a similar interface may be displayed on the thermostat as well as the user device.

In order to avoid user confusion as to the current operation of the cooling function, the thermostat may display an indication describing why the cooling function is currently operating. This may allow users to distinguish between operating the cooling function in order to lower the ambient temperature of the enclosure and operating the cooling function in order to reduce the humidity of the enclosure. The indication may also describe an occupancy status of the enclosure as determined by the thermostat.

Figure 15A:
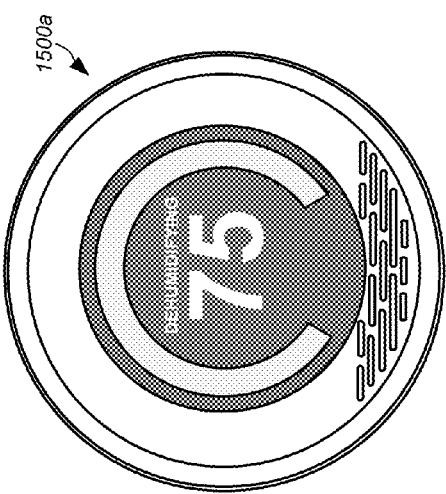
FIG. 15A illustrates a user interface of a thermostat indicating that the cooling function is operating as part of the auto dehumidification feature.
Figure 15B:
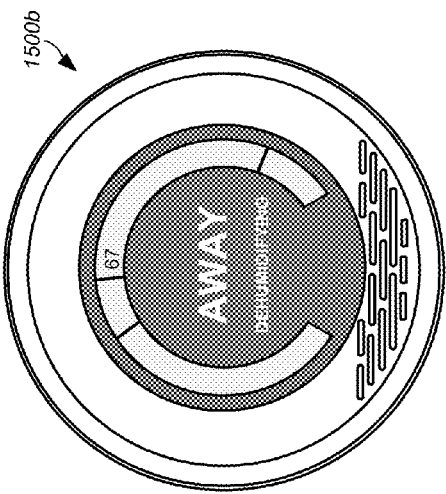
FIG. 15B illustrates a user interface of a thermostat indicating that the cooling function may be operating as part of the auto dehumidification feature while the thermostat is in the away state.
Figure 15C:
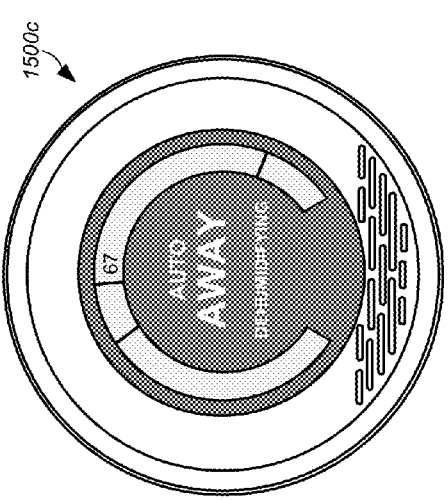
FIG. 15C illustrates a user interface of a thermostat indicating that the cooling function may be operating as part of the auto dehumidification feature while the thermostat is in the auto-away state.
Figure 15D:
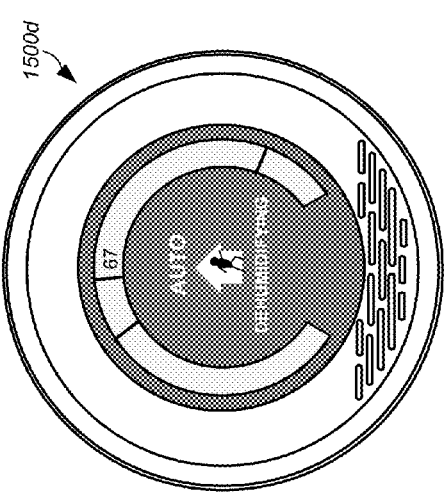
FIG. 15D illustrates a user interface of a thermostat indicating that the cooling function may be operating as a part of the auto dehumidification feature while the thermostat is in the long-term away state.

FIG. 15A illustrates a user interface of a thermostat 1500a indicating that the cooling function is operating as part of the auto dehumidification feature. In this embodiment, a current temperature may be displayed without showing time-to-temperature ticks along the dial of the interface. Alternatively, a current humidity may be displayed instead of a current temperature. FIG. 15B illustrates a user interface of a thermostat 1500b indicating that the cooling function may be operating as part of the auto dehumidification feature while the thermostat is in the away state. FIG. 15C illustrates a user interface of a thermostat 1500c indicating that the cooling function may be operating as part of the auto dehumidification feature while the thermostat is in the auto-away state. Finally, FIG. 15D illustrates a user interface of a thermostat 1500d indicating that the cooling function may be operating as a part of the auto dehumidification feature while the thermostat is in the long-term away state. Each of these indications may be changed by manually interacting with the thermostat by way of the user interface, or by providing commands to the thermostat from a user device or from a central monitoring station.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, while one or more of the above embodiments is applied in the context of a "cool-to-dry" feature, the principles of the present teachings are not necessarily limited to such scenarios. Thus, by way of example, in view of the present teachings one skilled in the art may adapt the present teachings to an equivalent but converse case of "do-not-heat-to-too-dry." For example, operating a heater may reduce the humidity of an enclosure, and depending on the particular context, air that is too dry may be undesirable for one or more reasons (for example, causing dry skin, damage to wood furniture or instruments, or endangering certain pet or plant life). Thus, in one alternative embodiment, the algorithms described herein may be applied in a converse context such that the heating function is limited in order to reduce the dryness that can result. For example, when the home is occupied, the heating function may perform as normal until the humidity drops to a specified threshold humidity level. When the home is unoccupied, the heating function may be limited in order to avoid too much of a reduction in humidity, but not limited so much as to allow pipes to freeze or to cause the enclosure to be too cold when the occupants return. Therefore, reference to the details of the preferred embodiments is not intended to limit their scope.

What is claimed is:
1. A thermostat, comprising:
   a housing;
   a user interface;
   one or more temperature sensors, each of the one or more temperature sensors being configured to provide temperature sensor measurements;
   a humidity sensor configured to provide humidity sensor measurements of humidity inside an enclosure in which the thermostat is installed;
   an occupancy sensing system that characterizes an occupancy status of the enclosure in which the thermostat is installed from among a plurality of possible occupancy statuses including an occupied state and an away state; and
   a processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based at least in part on the setpoint temperature and the temperature sensor measurements;
   wherein said processing system is further configured to operate in conjunction with said occupancy sensing system to:
      during a first time interval during which the occupancy sensing system characterizes the occupancy status of the enclosure as being in the occupied state:
         determine that the humidity sensor measurements exceed a first threshold humidity; and
         activate, in response to determining that the humidity sensor measurements exceed the first threshold humidity, a cooling function of the HVAC system to reduce the humidity level in the enclosure until any of a first set of conditions has been met, wherein the first set of conditions comprises:
            (i) the humidity sensor measurements being less than a second threshold humidity;
            (ii) the temperature sensor measurements indicating that a temperature in the enclosure is lower than a first threshold temperature; and
            (iii) a first maximum time interval for the cooling function to be active to reduce the humidity level in the enclosure while the humidity sensor measurements change by less than a first predetermined threshold amount; and
      during a second time interval during which the occupancy sensing system characterizes the occupancy status of the enclosure as being in the away state:
         determine that the humidity sensor measurements exceed a third threshold humidity; and
         activate, in response to determining that the humidity sensor measurements exceed the third threshold humidity, the cooling function of the HVAC system to reduce the humidity level in the enclosure until any of a second set of conditions has been met, wherein the second set of conditions comprises:
            i) the humidity sensor measurements being less than a fourth threshold humidity;
            ii) the temperature sensor measurements indicating that the temperature in the enclosure is lower than a second threshold temperature; and
            iii) a second maximum time interval for the cooling function to be active to reduce the humidity level in the enclosure while the humidity sensor measurements change by less than a second predetermined threshold amount.
2. The thermostat of claim 1 wherein the processing system is further configured to wait for a first backoff interval after any of the first set of conditions or any of the second set of conditions are met before again activating the cooling function of the HVAC system to reduce the humidity level in the enclosure.

3. The thermostat of claim 2 wherein the processing system is further configured to:
   determine when a threshold number of dehumidification cycles to reduce the humidity level in the enclosure have occurred; and
   wait for a second backoff interval after the other of the first set of conditions or the second set of conditions are met before again activating the cooling function of the HVAC system in order to reduce the humidity level in the enclosure.

4. The thermostat of claim 3 wherein the second time interval is at least twice as long as the first time interval.

5. The thermostat of claim 1 further comprising a wire insertion sensing system that automatically detects when a dehumidifier is connected to the thermostat, wherein the processing system is configured to stop activating the cooling function of the HVAC to reduce humidity in the enclosure when the dehumidifier is detected.

6. A method of dehumidifying an enclosure using a cooling function of an HVAC system, the method comprising:
   characterizing, using an occupancy sensing system of a thermostat, an occupancy status of the enclosure, the occupancy status being selected from among a plurality of possible occupancy statuses including an occupied state and an away state;
   processing humidity sensor measurements of humidity inside the enclosure provided by a humidity sensor of the thermostat, wherein the thermostat comprises:
      a housing;
      a user interface;
      one or more temperature sensors, each of the one or more temperature sensors being configured to provide temperature sensor measurements;
      the humidity sensor;
      The occupancy sensing system; and
      A processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based at least in part on the setpoint temperature and the temperature sensor measurements; and
   during a first time interval during which the occupancy sensing system characterizes the occupancy status of the enclosure as being in the occupied state:
   determining that the humidity sensor measurements exceed a first threshold humidity; and
   activating, in response to determining that the humidity sensor measurements exceed the first threshold humidity, a cooling function of the HVAC system to reduce the humidity level in the enclosure until any of a first set of conditions has been met wherein the first set of conditions comprises:
      (i) the humidity sensor measurements being less than a second threshold humidity;
      (ii) the temperature sensor measurements indicating that a temperature in the enclosure is lower than a first threshold temperature; and
      (iii) a first maximum time interval for the cooling function to be active to reduce the humidity level in the enclosure while the humidity sensor measurements change by less than a first predetermined threshold amount; and
   during a second time interval during which the occupancy sensing system characterizes the occupancy status of the enclosure as being in the away state:
   determining that the humidity sensor measurements exceed a third threshold humidity; and
   activating, in response to determining that the humidity sensor measurements exceed the third threshold humidity, the cooling function of the HVAC system to reduce the humidity level in the enclosure until any of a second set of conditions are met, wherein the second set of conditions comprises:
      i) the humidity sensor measurements being less than a fourth threshold humidity;
      ii) the temperature sensor measurements indicating that the temperature in the enclosure is lower than a second threshold temperature; and
      iii) a second maximum time interval for the cooling function to be active to reduce the humidity level in the enclosure while the humidity sensor measurements change by less than a second predetermined threshold amount.

7. The method of claim 6 further comprising waiting for a first backoff interval after any of the first set of conditions or any of the second set of conditions has been met before again activating the cooling function of the HVAC system to reduce the humidity level in the enclosure.

8. The method of claim 7 further comprising:
   determining when a threshold number of dehumidification cycles to reduce the humidity level in the enclosure have occurred; and
   waiting for a second backoff interval after the first/second set of conditions are met before again activating the cooling function of the HVAC system in order to reduce the humidity level in the enclosure.

9. The method of claim 8 wherein the second time interval is at least twice as long as the first time interval.

10. The method of claim 6 further comprising determining whether a dehumidifier is connected to the thermostat using a wire insertion sensing system, wherein the processing system is configured to stop activating the cooling function of the HVAC to reduce humidity in the enclosure when the dehumidifier is detected.

11. The thermostat of claim 1, wherein the first humidity threshold is higher than the third humidity threshold, and the first temperature threshold is higher than the second temperature threshold.

12. The thermostat of claim 1, wherein the maximum time interval for the cooling function to be active to reduce the humidity level in the enclosure while the humidity sensor measurements change by less than a threshold amount is 15 minutes.

13. The thermostat of claim 2, wherein the thermostat is configured to wait for the first backoff interval when any of the following conditions are met
   (i) the temperature sensor measurements indicate that the temperature in the enclosure is lower the second threshold temperature; and
   (ii) the first maximum time interval or the second maximum time interval for the cooling function to be active to reduce the humidity level in the enclosure while the humidity sensor measurements change by less than the threshold amount has been exceeded.

14. The thermostat of claim 3, wherein the threshold number of dehumidification cycles to reduce the humidity level in the enclosure comprises 3 dehumidification cycles.

15. The method of claim 6, wherein the first humidity threshold is higher than the third humidity threshold, and the first temperature threshold is higher than the second temperature threshold.

16. The method of claim 6, wherein the first maximum time interval or the second maximum time interval for the cooling function to be active to reduce the humidity level in the enclosure while the humidity sensor measurements change by less than a threshold amount is 15 minutes.

17. The method of claim 7, wherein the thermostat is configured to wait for the first backoff interval when any of the following conditions are met:
 (i) the temperature sensor measurements indicate that the temperature in the enclosure is lower the second threshold temperature; and
 (ii) the first maximum time interval or the second maximum time interval for the cooling function to be active to reduce the humidity level in the enclosure while the humidity sensor measurements change by less than the threshold amount has been exceeded.

18. The method of claim 8, wherein the threshold number of dehumidification cycles to reduce the humidity level in the enclosure comprises 3 dehumidification cycles.

* * * * *